United States Patent
Lonergan

(10) Patent No.: US 12,191,641 B2
(45) Date of Patent: Jan. 7, 2025

(54) ADAPTIVE SEAL FOR CABLE GLANDS

(71) Applicant: Hubbell Incorporated, Shelton, CT (US)

(72) Inventor: Lawrence Murray Lonergan, Manchester (GB)

(73) Assignee: HUBBELL INCORPORATED, Shelton, CT (US)

( * ) Notice: Subject to any disclaimer, the term of this patent is extended or adjusted under 35 U.S.C. 154(b) by 102 days.

(21) Appl. No.: 17/895,192

(22) Filed: Aug. 25, 2022

(65) Prior Publication Data
US 2023/0069558 A1 Mar. 2, 2023

Related U.S. Application Data

(60) Provisional application No. 63/238,289, filed on Aug. 30, 2021.

(51) Int. Cl.
*H02G 15/013* (2006.01)

(52) U.S. Cl.
CPC ................... *H02G 15/013* (2013.01)

(58) Field of Classification Search
CPC .... H02G 3/088; H02G 3/0666; H02G 3/0658; H02G 3/0625; H02G 15/32; H02G 15/117; H02G 15/046; H02G 15/04; H02G 15/013; H01B 17/58; F16L 5/10
See application file for complete search history.

(56) References Cited

U.S. PATENT DOCUMENTS

| | | | | |
|---|---|---|---|---|
| 4,515,991 A * | 5/1985 | Hutchison | ............ | H02G 3/0616 29/858 |
| 4,549,037 A * | 10/1985 | Bawa | ..................... | H02G 3/088 174/667 |
| 5,691,505 A * | 11/1997 | Norris | .................... | H02G 15/04 439/98 |
| 6,537,104 B1 * | 3/2003 | Hagmann | ............ | H02G 3/0666 439/461 |

(Continued)

FOREIGN PATENT DOCUMENTS

| CA | 2875463 A1 | 6/2015 |
|---|---|---|
| DE | 1165122 B | 3/1964 |

OTHER PUBLICATIONS

International Search Report and Written Opinion issued in App. No. PCT/US2022/041475, dated Nov. 25, 2022, 11 pages.

*Primary Examiner* — William H. Mayo, III
*Assistant Examiner* — Rhadames Alonzo Miller
(74) *Attorney, Agent, or Firm* — Dilworth IP, LLC

(57) ABSTRACT

An adaptive seal for a cable gland including a body including a compression portion defining a distal surface and an insertion portion defining a proximal surface, the compression portion having an outer diameter greater than an outer diameter of the insertion portion, a plurality of insertion apertures in the proximal surface, a plurality of tubes extending from the distal surface, each having a closed end and each at least partially tapering in diameter from the distal end of the body to the closed end, and a plurality of channels, each defined between one of the insertion apertures of the body and one of the closed ends of a respective one of the tubes, wherein the body and the plurality of tubes are integrally formed a single piece of elastic material.

20 Claims, 21 Drawing Sheets

(56) References Cited

U.S. PATENT DOCUMENTS

| | | | | |
|---|---|---|---|---|
| 6,809,263 B2* | 10/2004 | Jackson | ................. | H02G 3/065 |
| | | | | 174/651 |
| 6,812,406 B2* | 11/2004 | Hand | .................... | H02G 15/04 |
| | | | | 174/667 |
| 7,563,993 B2* | 7/2009 | Drotleff | ............... | H02G 15/007 |
| | | | | 174/653 |
| 7,749,021 B2* | 7/2010 | Brodeur | ................ | H01R 13/59 |
| | | | | 174/359 |
| 7,781,685 B2* | 8/2010 | Bartholoma | ........... | H02G 15/04 |
| | | | | 174/654 |
| 10,637,176 B1* | 4/2020 | Campbell | .......... | H01R 13/5816 |
| 2013/0217251 A1* | 8/2013 | Lin | ...................... | H02G 15/013 |
| | | | | 439/275 |
| 2014/0102780 A1* | 4/2014 | Aldrich | ................. | H02G 3/083 |
| | | | | 174/653 |
| 2015/0222107 A1* | 8/2015 | Jackson | ............... | H02G 15/046 |
| | | | | 174/142 |
| 2017/0059795 A1* | 3/2017 | Camarda | ................. | H05K 5/06 |
| 2017/0261709 A1* | 9/2017 | Camarda | ................. | H02G 3/22 |
| 2018/0128400 A1* | 5/2018 | Twelves | ............... | H02G 15/013 |
| 2018/0301885 A1* | 10/2018 | Jackson | ............... | H02G 3/0666 |
| 2020/0144799 A1* | 5/2020 | Lakerdas | ............. | H02G 3/0437 |
| 2021/0344132 A1* | 11/2021 | Pavlovic | ............ | H01R 13/2407 |

\* cited by examiner

ADAPTIVE SEAL FOR CABLE GLANDS

FIELD OF THE INVENTION

The present disclosure relates to cable glands, and more particularly, to an adaptive diaphragm seal for use in cable glands.

BACKGROUND

Cable gland assemblies are commonly used for sealing around a cable or conduit passing through an opening in a wall or bulkhead, particularly in hazardous environments. For example, cable gland assemblies may be used to seal around a cable entering an enclosure, such as a junction box containing electrical equipment. The cable gland prevents fluids entering or exiting the enclosure and provides a flame-proof path to contain any explosion occurring within the junction block.

A cable gland generally employs a sealing arrangement that surrounds a cable extending through the gland assembly to provide a flameproof seal around cable conductors or cores. A common sealing arrangement is a sealing compound that is urged inwardly to engage and seal around the cable in a potting chamber when two parts of the gland assembly are screwed together. Sealing compound is difficult to work with and can result in an imperfect seal having voids. Sealing compound also needs time to cure, e.g., up to twenty-four hours, which significantly delays completion of the installation. Another solution is a solid silicone seal through which holes must be individually punched with an expensive tool that is specific to the gauge of the cable connectors.

Two other known solutions are diaphragm glands and compression glands. In a diaphragm gland, a diaphragm seal gland forms a flameproof barrier on the inner sheath of the cable. The cavities in the cable between the conductors must be effectively filled to prevent flame transmission. The barrier is formed by a flexible rubber membrane which must be supported underneath by a plastic cage. Together they withstand the force of the flame without unduly causing damage to the inner sheath of the cable, which may be made of particularly soft material. However, several components are required for this gland to perform functionally. A compression seal is compressed against the inner sheath of the cable by the force of the entry and middlenut acting against it. Although it is a single component, the disadvantage is that it can be over compressed and thus may cause damage to the cable.

There is a need for improved sealing arrangements and cable glands employing the same. The present invention solves these and other problems in the prior art.

SUMMARY

An object of the present invention is to provide a sealing arrangement which provides an instant barrier without needing to wait for a compound to cure. A further object is to provide a sealing arrangement that is fool-proof and avoids risk of voids or inadequate conductor spacing.

In one exemplary embodiment according to the present disclosure, an adaptive seal for a cable gland is provided, including a body having a proximal surface and a distal surface, an insertion aperture in the proximal surface of the body, a tube formed integrally with and extending from the distal surface of the body, the tube having a distal end, and a channel defined between the insertion aperture of the body and the distal end of the tube, the channel having a proximal inner diameter at the insertion aperture and a distal inner diameter at the distal end, the proximal inner diameter being greater than the distal inner diameter.

In some embodiments, the distal end of the tube is closed wherein the distal end is adapted to be opened by cutting or puncturing the distal end.

The adaptive seal may further include a second insertion aperture in the proximal surface of the body, a second tube formed integrally with and extending from the distal surface of the body, the second tube having a second distal end, and a second channel defined between the second insertion aperture and the second distal end.

In some embodiments, the body includes a compression portion defining the distal surface and an insertion portion defining the proximal surface, the compression portion having an outer diameter greater than an outer diameter of the insertion portion. In some embodiments, the adaptive seal further includes a retainer including holes adapted to receive each of the tube and the second tube. In some embodiments, the tube at least partially tapers in diameter from the distal surface of the body to the distal end.

Further provided is an adaptive seal for a cable gland, including a body including a compression portion defining a distal surface and an insertion portion defining a proximal surface, the compression portion having an outer diameter greater than an outer diameter of the insertion portion, a plurality of insertion apertures in the proximal surface, a plurality of tubes extending from the distal surface, each having a closed end and each at least partially tapering in diameter from the distal end of the body to the closed end, and a plurality of channels, each defined between one of the insertion apertures of the body and one of the closed ends of a respective one of the tubes, wherein the body and the plurality of tubes are integrally formed a single piece of elastic material. In some embodiments, each of the closed ends are adapted to be opened by cutting or puncturing the respective closed end.

Further provided is a cable gland, including an entry component, a backnut threadably engaged to the entry component, and a seal at least partially within the entry component, the seal including a body having a proximal surface and a distal surface, an insertion aperture in the proximal surface of the body, a tube extending from the distal surface of the body and having a closed end, and a channel defined between the insertion aperture of the body and the closed end of the tube. The cable gland may further include a spigot and a middlenut.

In some embodiments, the channel has a proximal inner diameter at the insertion aperture and a distal inner diameter at the closed end, the proximal inner diameter being greater than the distal inner diameter.

In some embodiments, the body of the seal includes a compression portion defining the distal surface and an insertion portion defining the proximal surface, the compression portion having an outer diameter greater than an outer diameter of the insertion portion.

In some embodiments, the seal includes a plurality of the insertion apertures and a plurality of the tubes. The body and the plurality of tubes are integrally formed a single piece of elastic material.

Further provided is a method of sealing a cable gland including steps of providing an adaptive seal including a body including a compression portion defining a distal surface and an insertion portion defining a proximal surface, a plurality of insertion apertures in the proximal surface, a plurality of tubes extending from the distal surface, each having a closed end, and a plurality of channels, each defined between one of the insertion apertures of the body and one of the closed ends of a respective one of the tubes. The method further includes steps of selectively opening at least one of the tubes, inserting a conductor through one of the insertion apertures, through the body, and out the opened end of the tube. The method further includes positioning the seal in a cable gland and closing the cable gland. In some embodiments, a spigot of the cable gland applies pressure to the compression portion and retains the seal in the cable gland.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
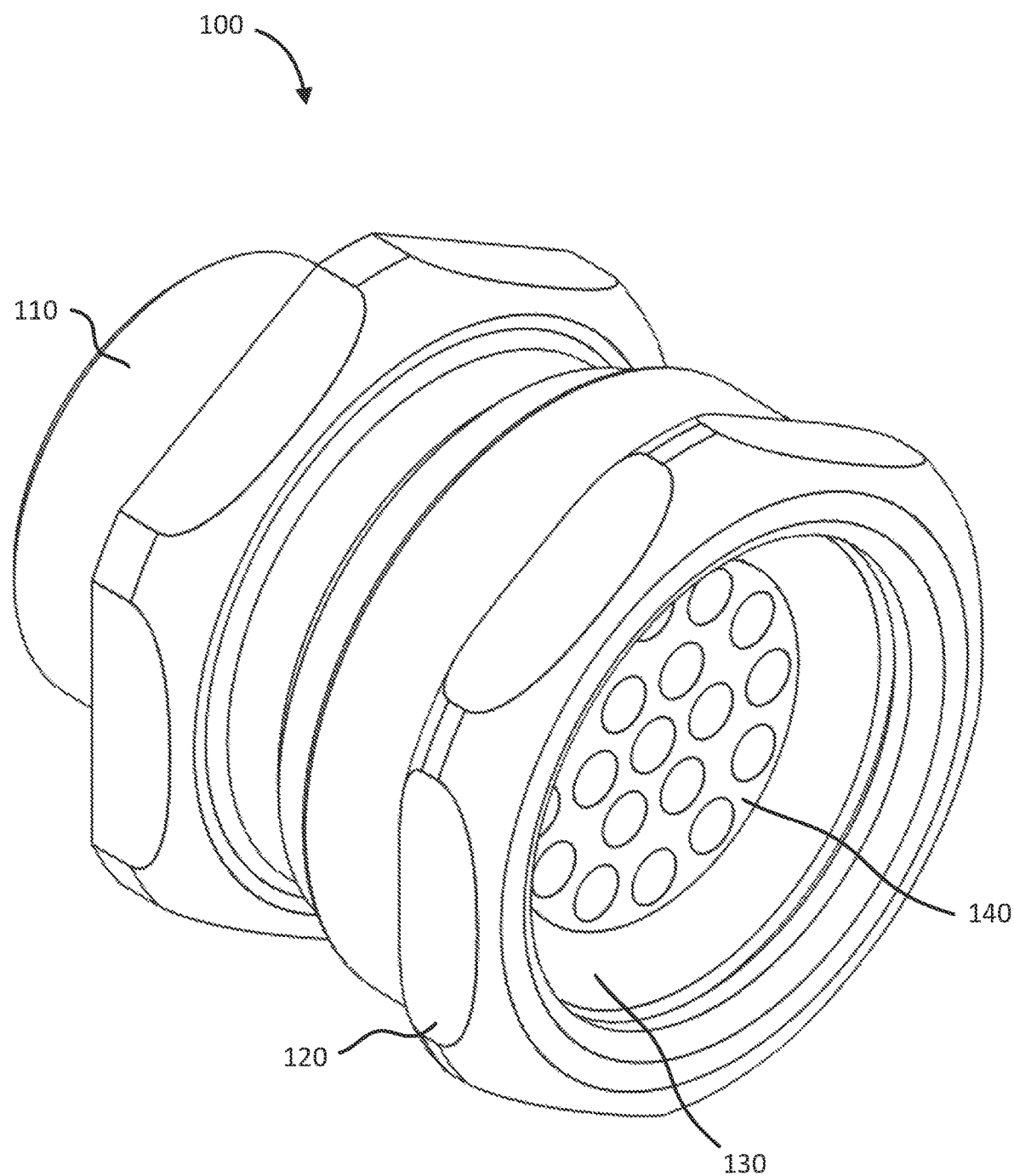
FIG. 1 is an isometric view of a cable gland according to an exemplary embodiment of the present disclosure.
Figure 2:
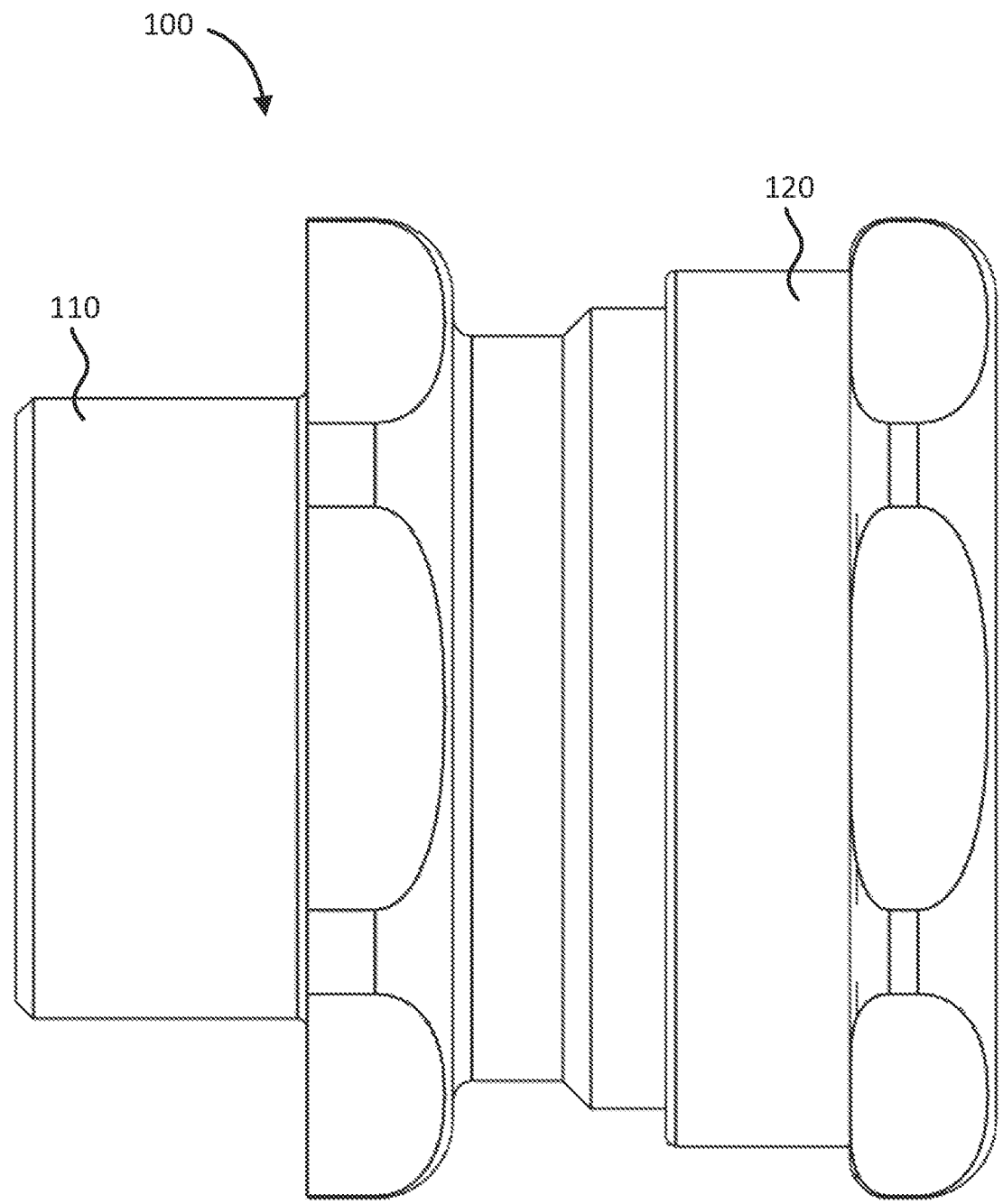
FIG. 2 is a side view of the cable gland shown in FIG. 1.
Figure 3:
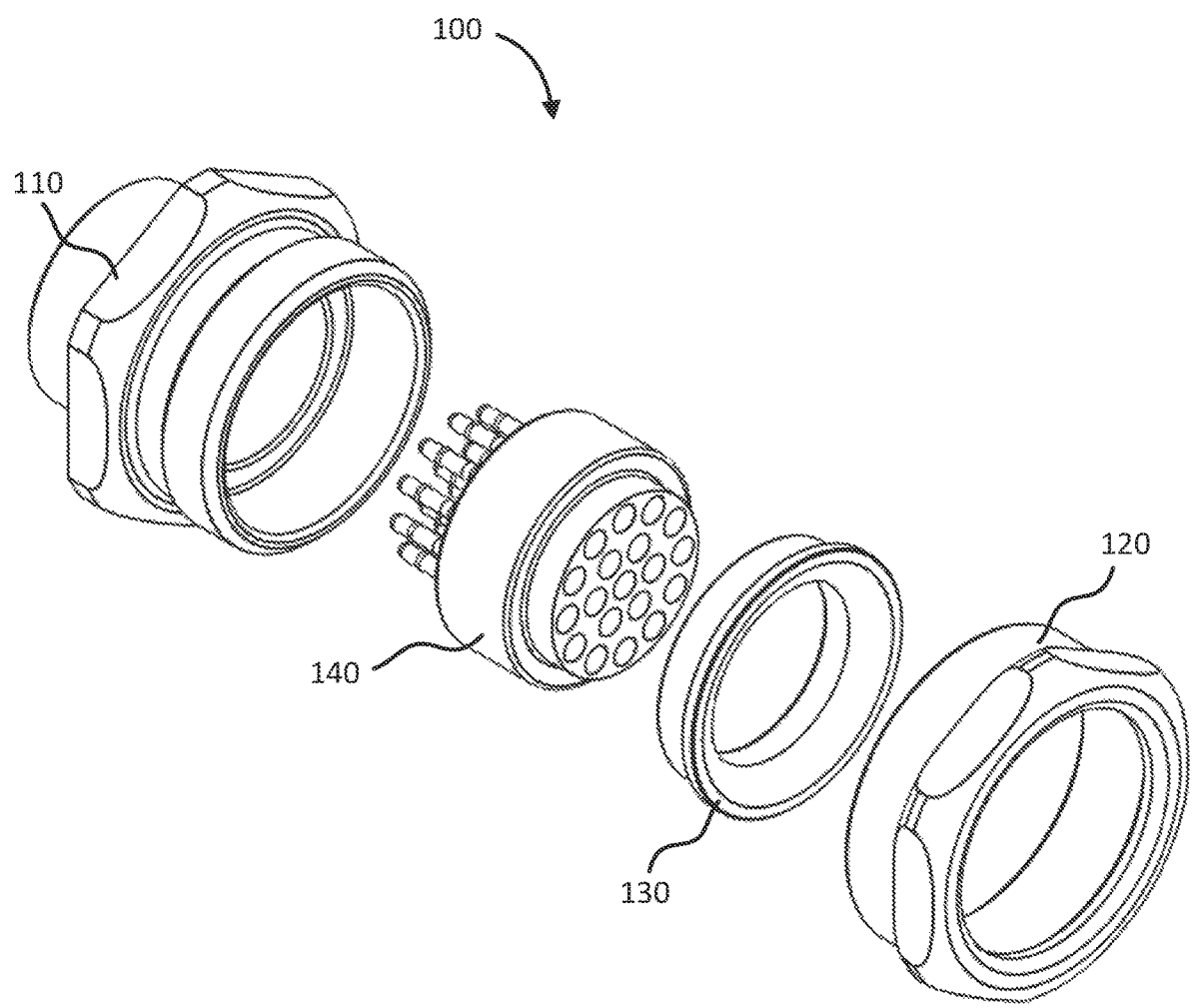
FIG. 3 is an exploded view of the cable gland shown in FIG. 1.

FIGS. 1-3 show isometric, side, and exploded views, respectively, of a cable gland 100 according to an exemplary embodiment of the present disclosure. The cable gland 100 includes an entry 110 (or entry component) and a backnut 120. The backnut 120 is threadably connected to the entry 110. In some embodiments, the entry 110 and backnut 120 are made of metal such as brass. An adaptive seal 140 according to an exemplary embodiment of the present disclosure is removably positioned within the entry 110. The cable gland 100 may further include a spigot 130. Rotation of the backnut 120 engages the spigot 130 against the seal 140 to retain the seal 140 within the entry 110 and/or cable gland 100.

Figure 4:
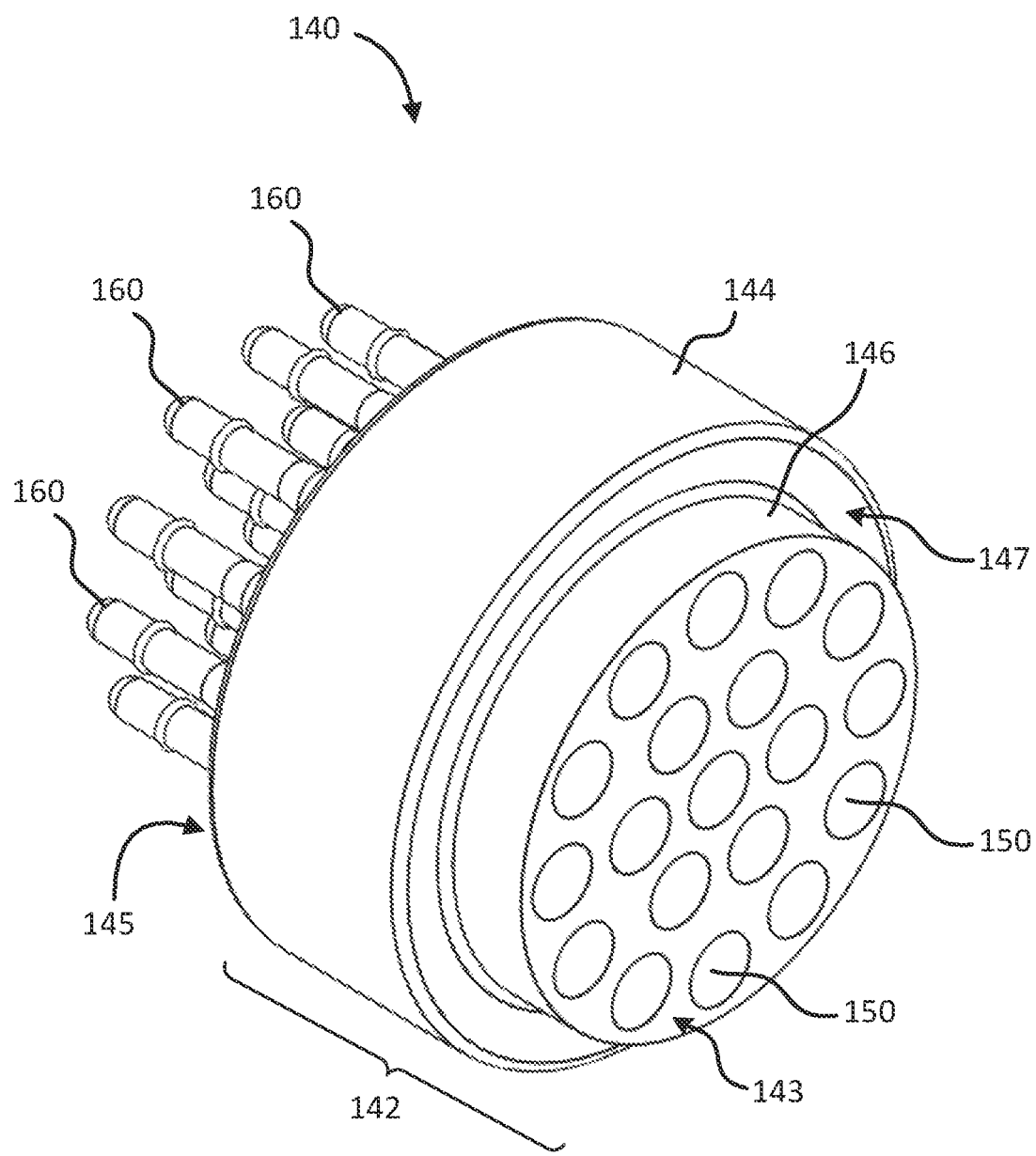
FIG. 4 is an isometric view of a seal of the cable gland shown in FIG. 1.

FIG. 4 is an isometric view of the seal 140. The seal 140 includes a body 142 having a proximal surface 143 and a distal surface 145. In the exemplary embodiment, the body 142 is defined by a compression portion 144 and an insertion portion 146. The body 142 is preferably cylindrical. The insertion portion 146 includes one or a plurality of apertures 150 in the proximal surface 143. The compression portion 144 may have an outer diameter greater than an outer diameter of the insertion portion 146. The difference in diameters creates a step between the compression portion 144 and the insertion portion 146 defining a compression surface 147. The spigot 130 at least partially circumscribes the insertion portion 146 and engages against the compression surface 147 of the compression portion 144.

The seal 140 further includes one or a plurality of tubes 160 or diaphragms projecting from the distal surface 145 of the body 142. The body 142 and tubes 160 are integrally formed a single piece made from an elastic material, such as silicone. Each aperture 150 has a corresponding tube 160. As explained in further detail below, each tube 160 is at least partially hollow to define a channel extending from a respective aperture 150 to a distal end of the tube 160. Conductors (or cores) of a cable are each inserted through a respective aperture 150, into, and through a respective tube 160. The tubes 160 may accommodate a range of conductor sizes. In some embodiments, the tubes 160 accommodate conductors having diameters of 1.5-4.0 mm. In other embodiments, the tubes 160 accommodate conductors having diameters of 4.0 mm to 6.0 mm or greater.

Figure 5A:
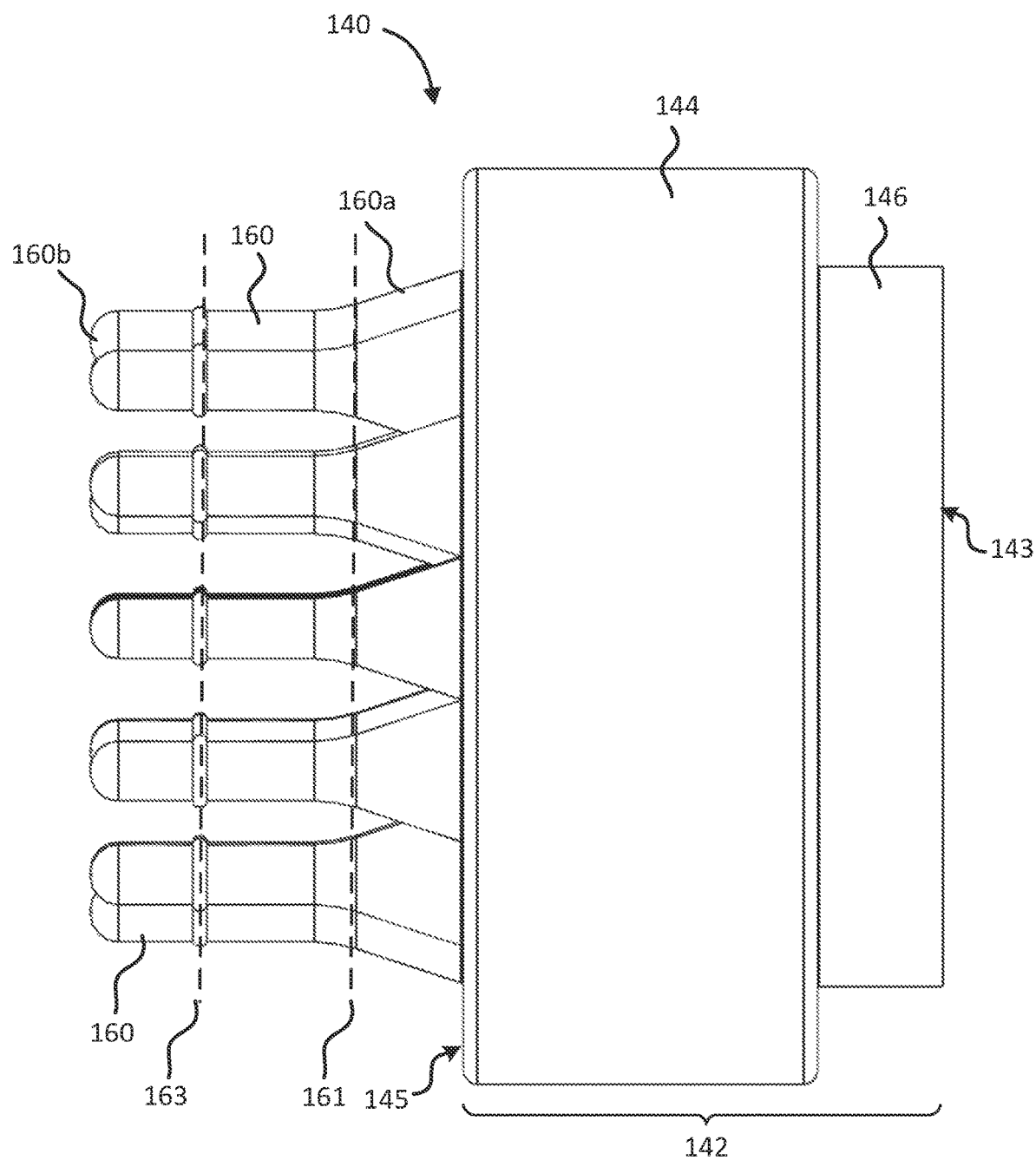
FIG. 5A is a side view of the seal shown in FIG. 4.
Figure 5B:
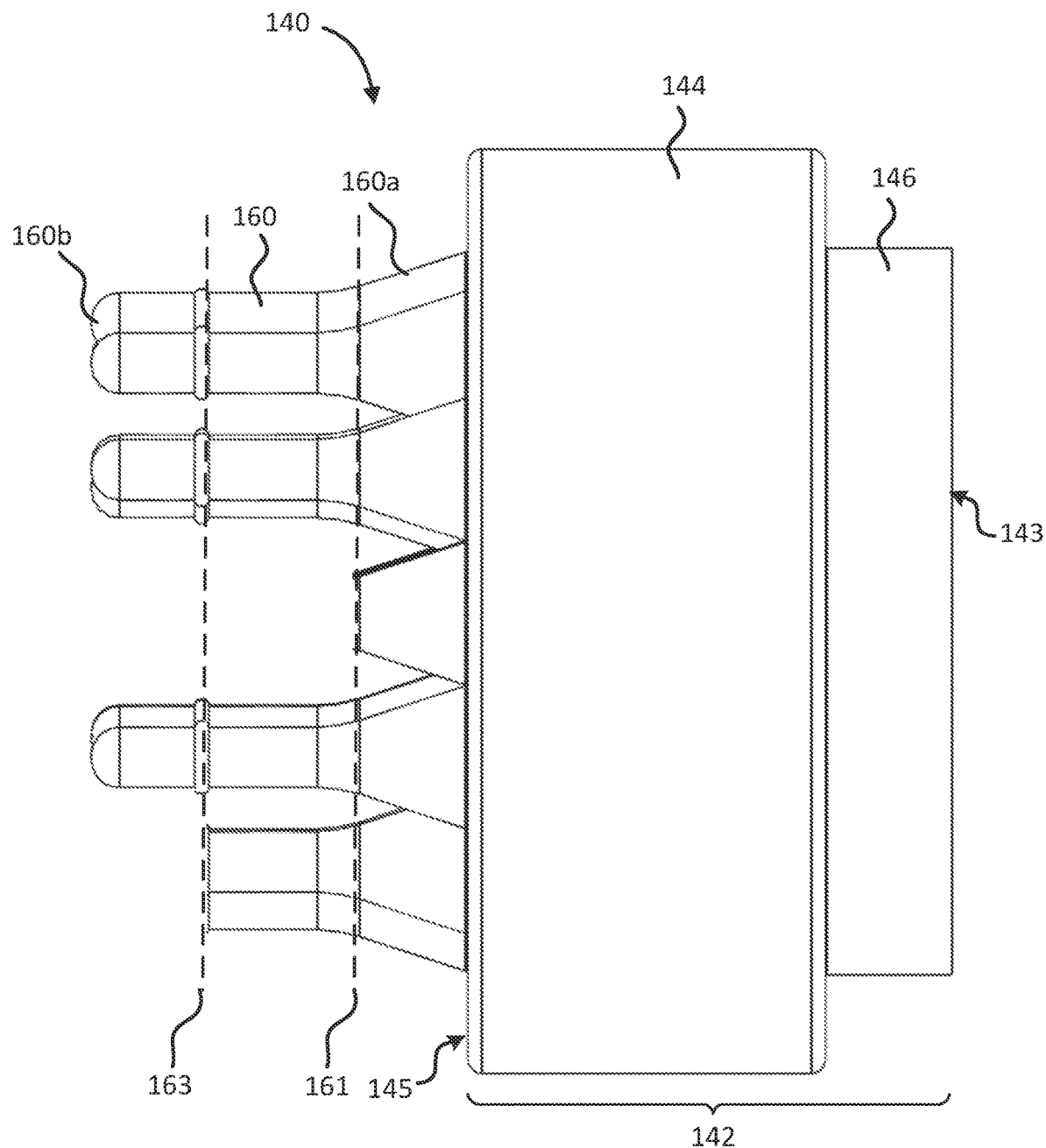
FIG. 5B is another side view of the seal shown in FIG. 4.

FIGS. 5A and 5B are side views of the seal 140 shown in FIG. 4. The tubes 160 may at least partially taper in diameter from a proximal end 160*a* to a distal end 160*b*. In the exemplary embodiment, the tubes 160 include a tapering portion adjacent to the distal surface 145 and a distal portion having a constant or near constant diameter. In the exemplary embodiment, the distal ends 160*b* of the tubes 160 are initially closed until use. Conductors may be selectively introduced into and extend through all, or only some, of the tubes 160 via the apertures 150.

In some embodiments, a tube 160 may be opened by penetrating a conductor therethrough, i.e., inserting a conductor into an aperture 150, through the body 142 and tube 160, to penetrate the closed distal end 160*b*. In some such embodiments, a tube 160 may have a puncturable closure that is within the channel rather than at the distal end 160*b*. Penetrating the closure may be best suited for larger gauge conductors though it is not limited thereto.

In a preferred embodiment, as shown in FIG. 5B, the tube 160 may be cut at a predetermined position along the tube 160, such as at position 161 or position 163. Cutting at position 161, where the tube 160 has a larger diameter, may be suitable for larger gauge cables while cutting at position 163, where the tube 160 has a smaller diameter, may be desired for narrower gauge cables. Cutting positions 161 and 163 are only exemplary. In some embodiments, the tube 160 may be cut at any desired position along its length. In some embodiments, the tubes 160 may include indications on their exterior surfaces identifying suggested cutting locations for various gauges of conductors.

Figure 6:
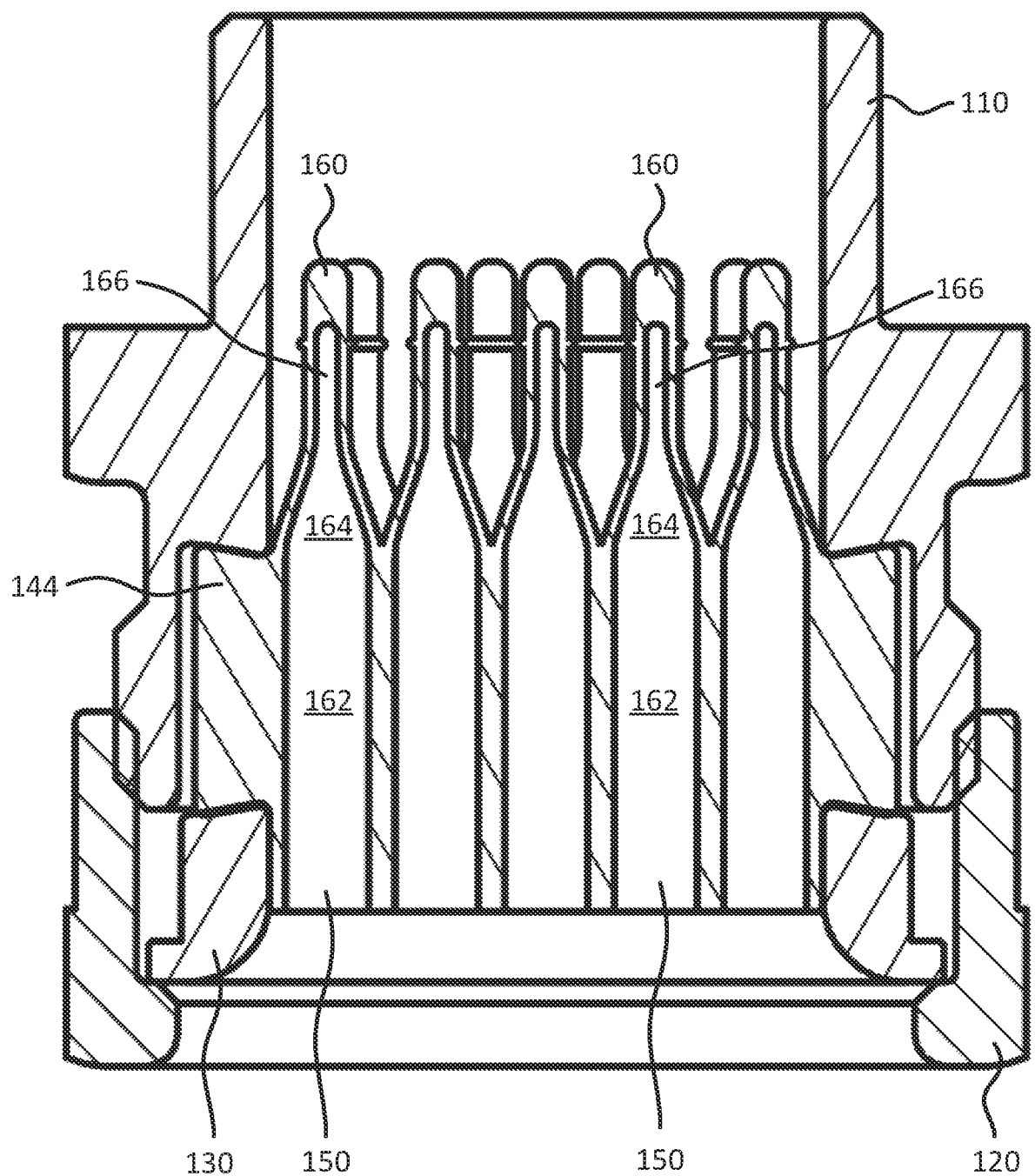
FIG. 6 is a side sectional view of the cable gland shown in FIG. 1.

FIG. 6 is a side sectional view of the cable gland 100 including the seal 140. As illustrated, channels are defined through the seal 140 extending from each aperture 150 to each corresponding tube 160. In the exemplary embodiment, each channel has a first portion 162 with a constant diameter extending at least partially through the body 142. In other embodiments, the first portion 162 may taper in diameter along its length. At or beyond the distal surface 145, the channels having a tapering portion 164 followed by a distal portion 166.

The channels may be sized to receive a particular gauge or a maximum gauge of conductor. The compression portion 144 of the seal 140 may be selectively compressed and, in turn, selectively displaced radially inward during installation. In some embodiments, the cable gland 100 is closed (and the seal 140 compressed) to a fixed degree, e.g., according to markers on the outside of the cable gland 100. In some embodiments, larger channels and tubes can accommodate narrower gauge conductors with additional compression. However, unlike compression seals, a particular compression is generally not necessary to form a seal since the tubes 160 seal around the conductors regardless of compression.

Cable glands according to the present disclosure may have different sizes, shapes, and configurations to suit different applications. Furthermore, the seals according to the present may include any number of tubes and channels and different diameters of tubes and channels. The embodiment shown in FIGS. 1-6 includes nineteen (19) tubes 160. While this embodiment can accommodate nine-teen (19) conductors, all of the tubes 160 need not be used. Any unused tubes 160 may remain uncut and closed. The seal is maintained when a tube 160 is uncut. Further, unused channels may at least partially close during compression of the compression portion 144.

Figure 7A:
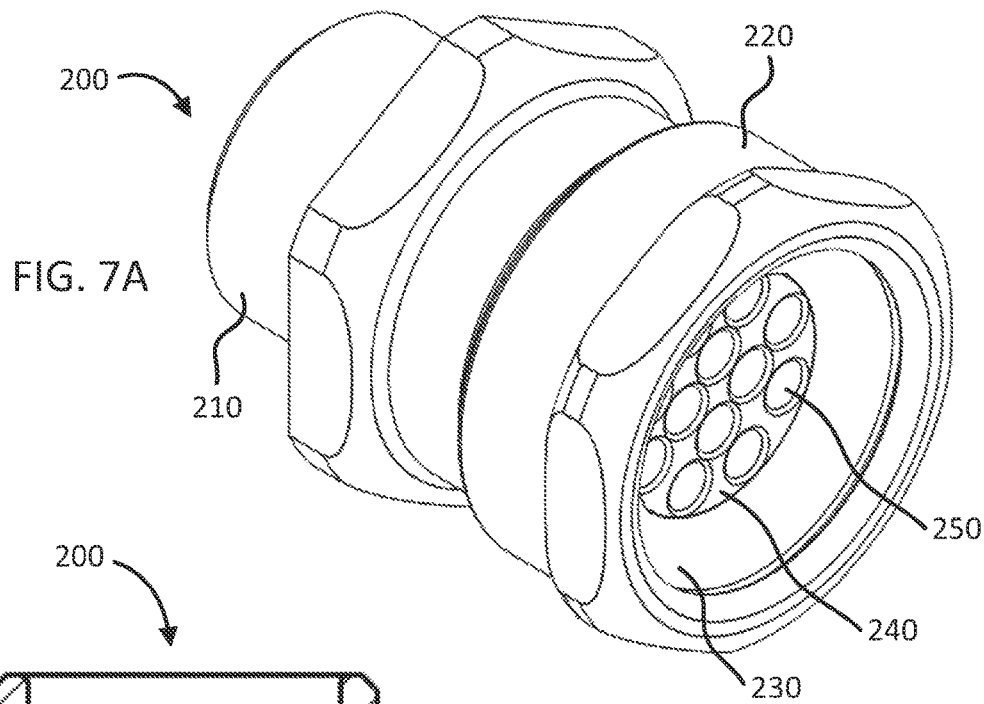
FIG. 7A is an isometric view of a cable gland according to an exemplary embodiment of the present disclosure.
Figure 7B:
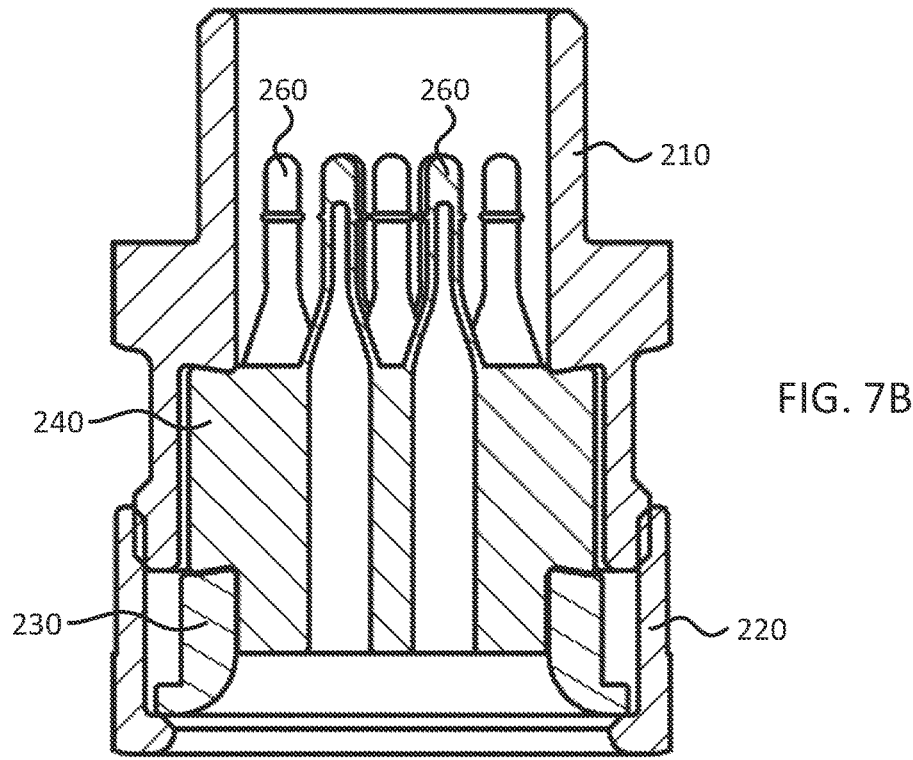
FIG. 7B is a side sectional view of the cable gland shown in FIG. 7A.

FIGS. 7A and 7B are isometric and side sectional views, respectively, of a cable gland 200 according to an exemplary embodiment of the present disclosure. The cable gland 200 includes an entry 210 and a backnut 220. An adaptive seal 240 according to an exemplary embodiment of the present disclosure is removably positioned within the entry 210. The cable gland 200 further includes a spigot 230. In this exemplary embodiment, the seal 240 includes twelve (12) tubes 260 with twelve (12) corresponding apertures 250.

Figure 8A:
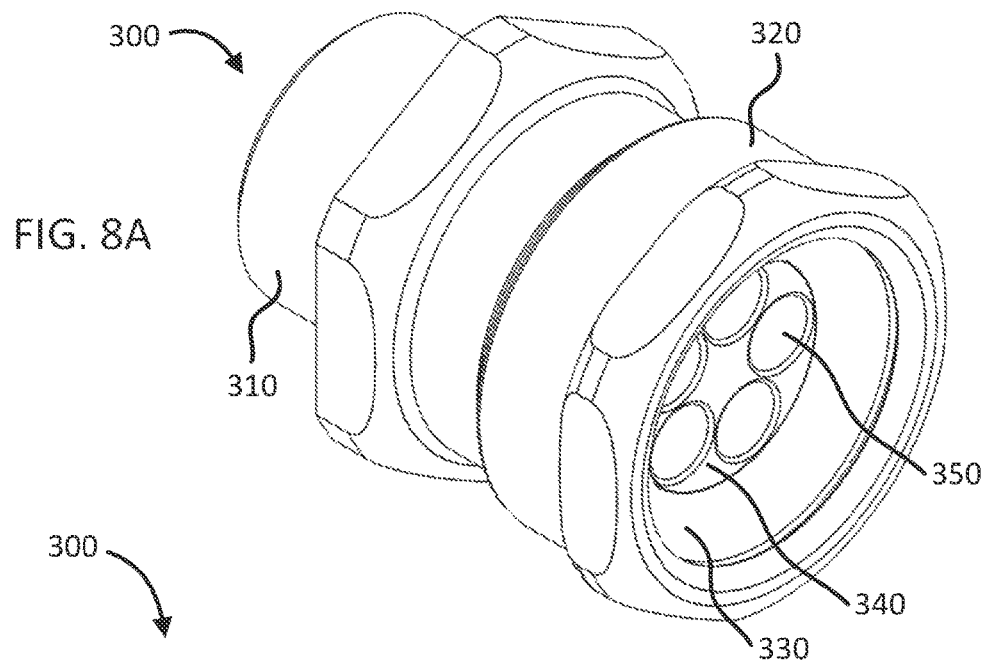
FIG. 8A is an isometric view of a cable gland according to an exemplary embodiment of the present disclosure.
Figure 8B:
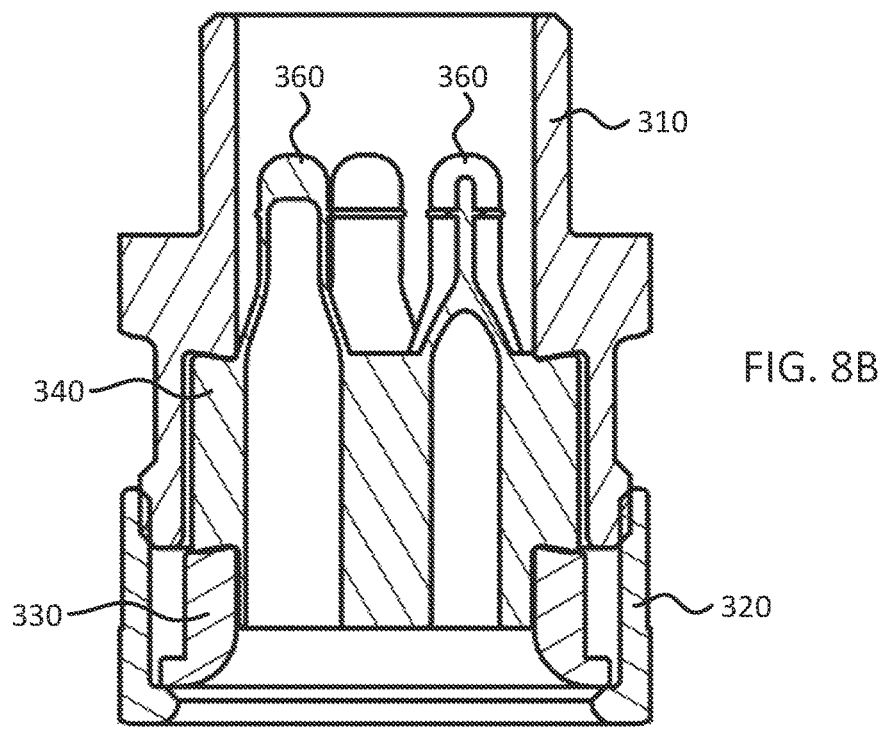
FIG. 8B is a side sectional view of the cable gland shown in FIG. 8A.

FIGS. 8A and 8B are isometric and side sectional views, respectively, of a cable gland 300 according to an exemplary embodiment of the present disclosure. The cable gland 300 includes an entry 310 and a backnut 320. An adaptive seal 340 according to an exemplary embodiment of the present disclosure is removably positioned within the entry 310. The cable gland 300 further includes a spigot 330. In this exemplary embodiment, the seal 340 includes five (5) tubes 360 with five (5) corresponding apertures 350.

Figure 9A:
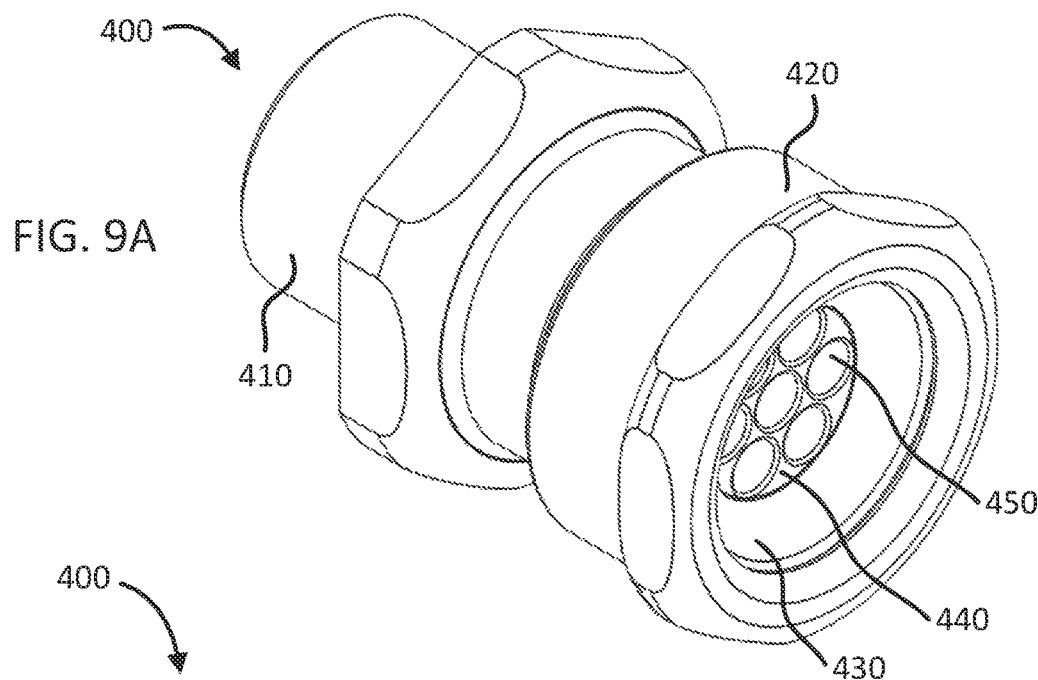
FIG. 9A is an isometric view of a cable gland according to an exemplary embodiment of the present disclosure.
Figure 9B:
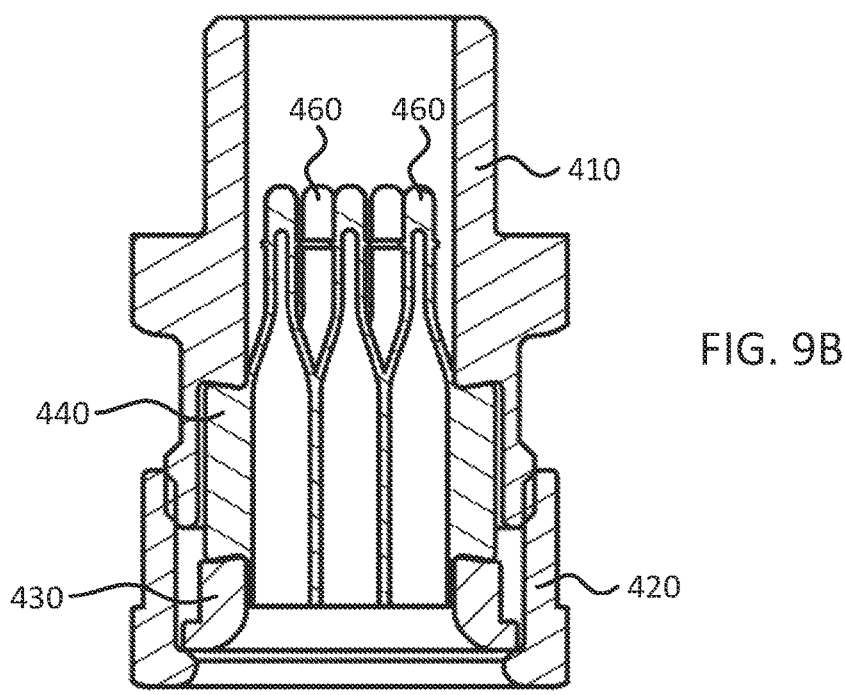
FIG. 9B is a side sectional view of the cable gland shown in FIG. 9A.

FIGS. 9A and 9B are isometric and side sectional views, respectively, of a cable gland 400 according to an exemplary embodiment of the present disclosure. The cable gland 400 includes an entry 410 and a backnut 420. An adaptive seal 440 according to an exemplary embodiment of the present disclosure is removably positioned within the entry 410. The cable gland 400 further includes a spigot 430. In this exemplary embodiment, the seal 440 includes seven (7) tubes 460 with seven (7) corresponding apertures 450.

Figure 10A:
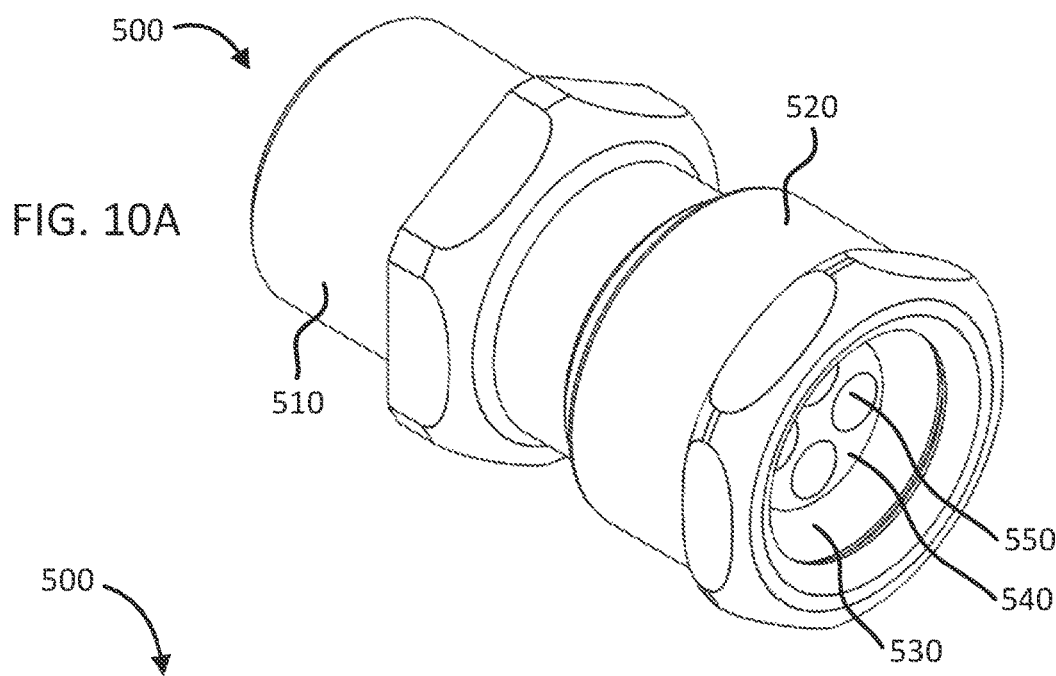
FIG. 10A is an isometric view of a cable gland according to an exemplary embodiment of the present disclosure.
Figure 10B:
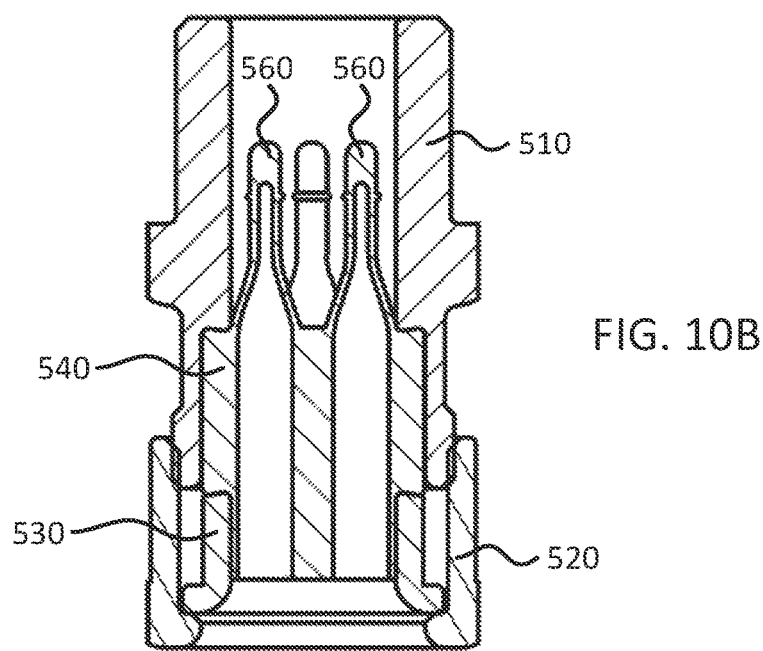
FIG. 10B is a side sectional view of the cable gland shown in FIG. 10A.

FIGS. 10A and 10B are isometric and side sectional views, respectively, of a cable gland 500 according to an exemplary embodiment of the present disclosure. The cable gland 500 includes an entry 510 and a backnut 520. An adaptive seal 540 according to an exemplary embodiment of the present disclosure is removably positioned within the entry 510. The cable gland 500 further includes a spigot 530. In this exemplary embodiment, the seal 540 includes ten (10) tubes 560 with ten (10) corresponding apertures 550.

Figure 11A:
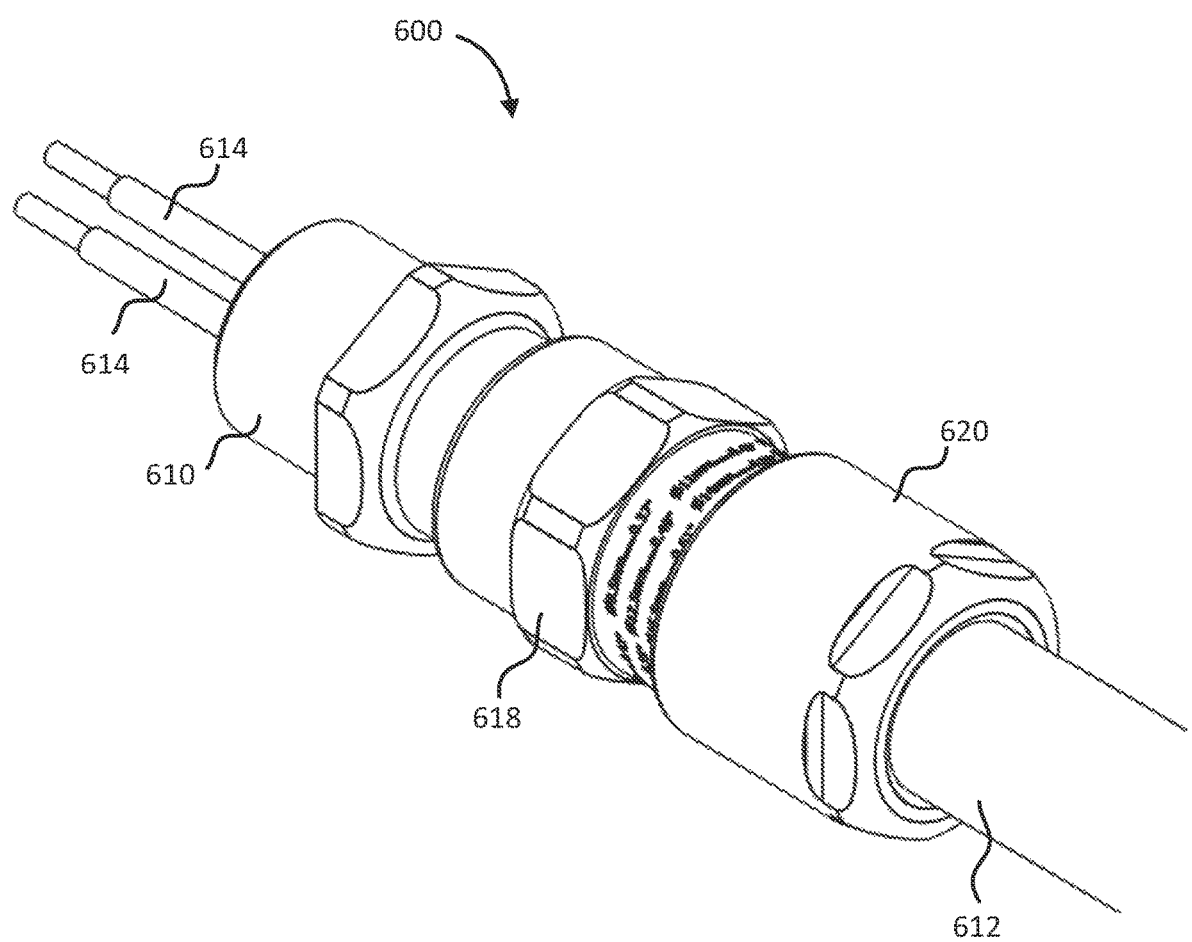
FIG. 11A is an isometric view of a cable gland according to an exemplary embodiment of the present disclosure.

FIG. 11A is isometric view of a cable gland 600 according to an exemplary embodiment of the present disclosure. As one skilled in the art will understand, the cable gland 600 may be suitable for sheathed cables, though it is not limited thereto. An example of a cable gland for sheathed cables is disclosed in U.S. Pat. No. 6,812,406, the content of which are incorporated herein by reference. The cable gland 600 includes an entry 610, a middlenut 618, and a backnut 620. The cable gland 600 is shown receiving a cable 612 having a plurality of conductors 614.

Figure 11B:
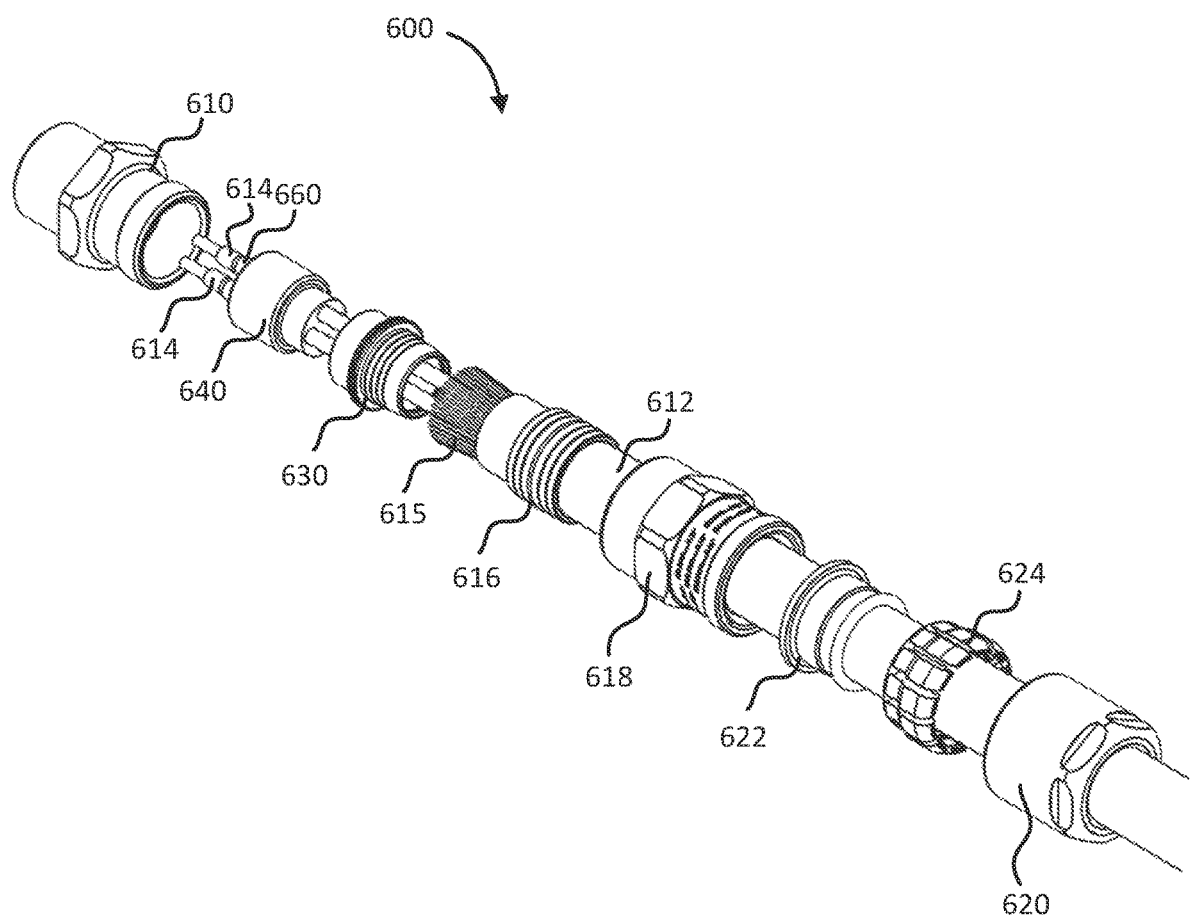
FIG. 11B is an exploded view of the cable gland shown in FIG. 11A.

FIG. 11B shows an exploded view of the cable gland 600 with the cable 612. The cable gland 600 includes a seal 640 according to the present disclosure and a spigot 630 for engagement against the seal 640. The seal 640 is a multiple adaptive seal, i.e., for receiving multiple conductors. A backnut seal 622 and a backnut clamp 624 may be provided between the middlenut 618 and the backnut 620. The cable 612 may have sheathing 615 (e.g., cable armor or braid). An armor clamp 616 provides an anchor for the sheathing 615. The seal 640 includes a plurality of tubes 660 for receiving the conductors 614 of the cable 612.

The cable 612 extends through the cable gland 600 from the backnut 620 to the entry 610 (or vice versa). During installation, the cable 612 is spliced to reveal the conductors 614. Some or all of the tubes 660 of the seal 640 are selectively opened by the installer (e.g., by cutting) and the conductors 614 are fed through the seal 640. The tubes 660 may be cut at the same or different locations along their lengths depending on the gauges of the conductors 614. The cable gland 600 is then closed by engaging the entry 610, middlenut 618, and backnut 620. The middlenut 618 imparts a compressive force onto the adaptive seal 640 via the armor clamp 616 and spigot 630. The cable 612 can then be energized right away.

Figure 11C:
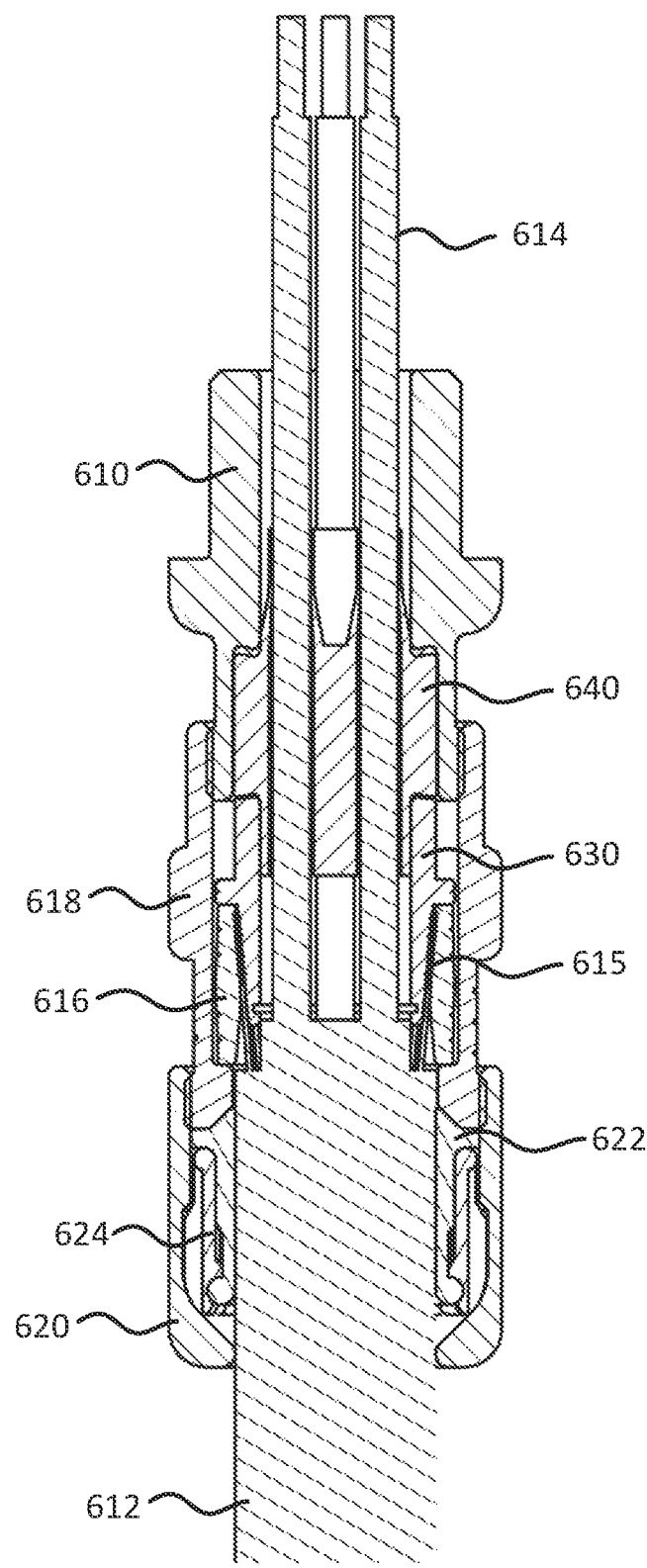
FIG. 11C is a side sectional view of the cable gland shown in FIG. 11A.

FIG. 11C shows a side sectional view of the cable gland 600. The conductors 614 extend through the seal 640 and out of the entry 610. The seal 640 may be compressed by the spigot 630. Depending on the gauge of the conductors 614 and/or the number of unused tubes 660 (if any), the seal 640 may be more or less compressed (or not compressed at all) to ensure a proper seal. The tubes 660 may be adjacent to an inner surface of the entry 610, preferably with a space in between. A space may be desired to avoid compressing of the conductors 614. However, the space is preferably small enough such that a tube 660 cannot collapse or invert under pressure.

The cable glands shown in FIGS. 1-11C each include a multiple adaptive seal which receive multiple conductors in individual tubes of the seal. A multiple adaptive seal may be used with any cable but is particularly useful for cables which do not have the capability to prevent flame propagation between the conductors (e.g., sometimes referred to as not effectively filled cables), and/or with cables for which flame propagation resistance properties are uncertain. In other embodiments, the adaptive seal may be a single adaptive seal which seals around the inner sheath of a cable. The single adaptive seal is useful for cables which do have the capability to prevent flame propagation between the conductors (e.g., sometimes referred to as effectively filled cables) and/or any cables for which sealing between the individual conductors is not necessary or desired. Those skilled in the art will understand that sealing around the cable itself (versus around the individual conductors) may be sufficient when the cable is manufactured with effective filling/bedding between the conductors. FIGS. 12A-13C illustrate examples of such seals according to exemplary embodiments of the present disclosure.

Figure 12A:
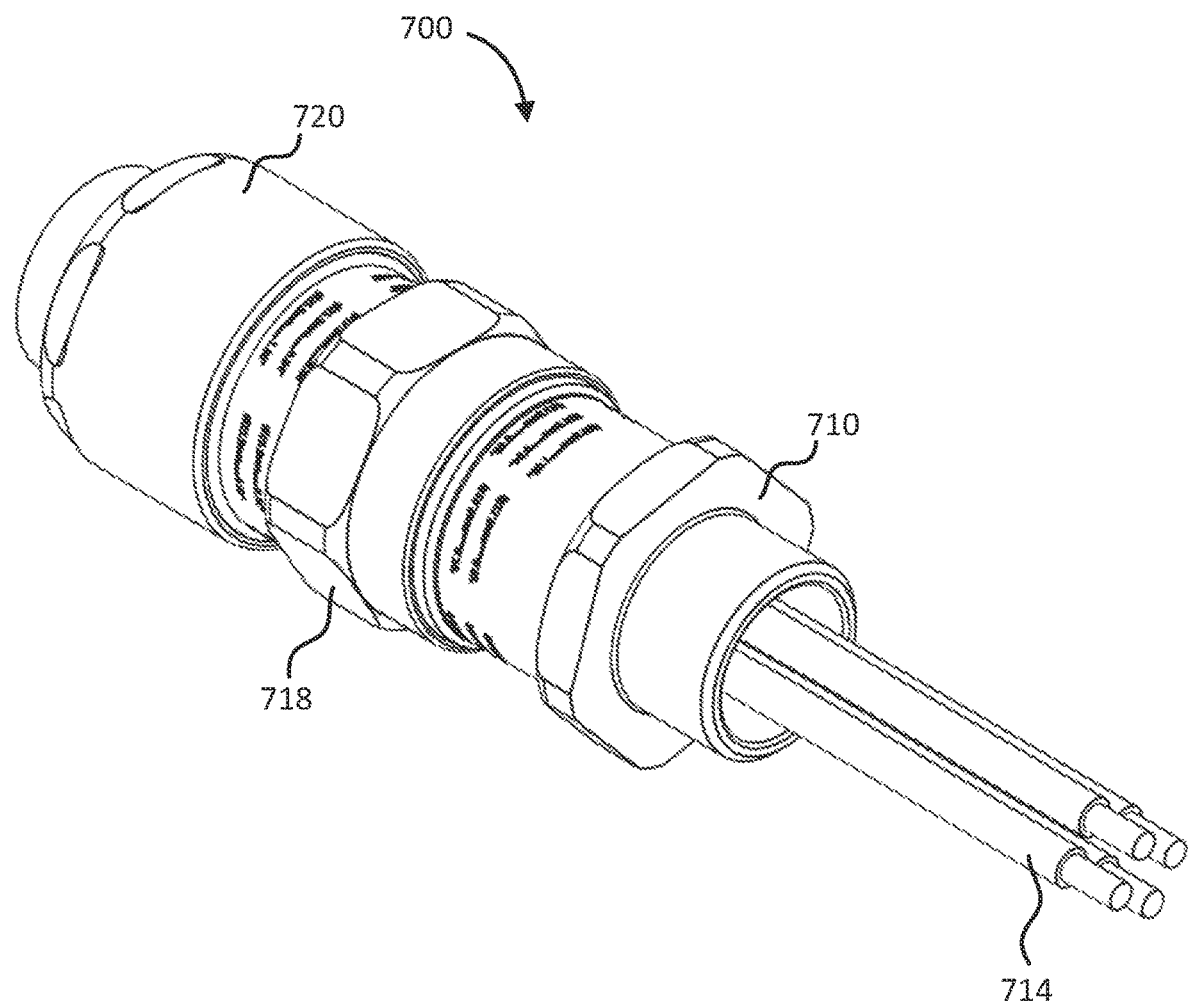
FIG. 12A is an isometric view of a cable gland according to an exemplary embodiment of the present disclosure.

FIG. 12A is isometric view of a cable gland 700 according to an exemplary embodiment of the present disclosure. As one skilled in the art will understand, the cable gland 700 may be suitable for sheathed cables, though it is not limited thereto. The cable gland 700 includes an entry 710, a middlenut 718, and a backnut 720. The cable gland 700 is shown with a cable 712 having a plurality of conductors 714.

Figure 12C:
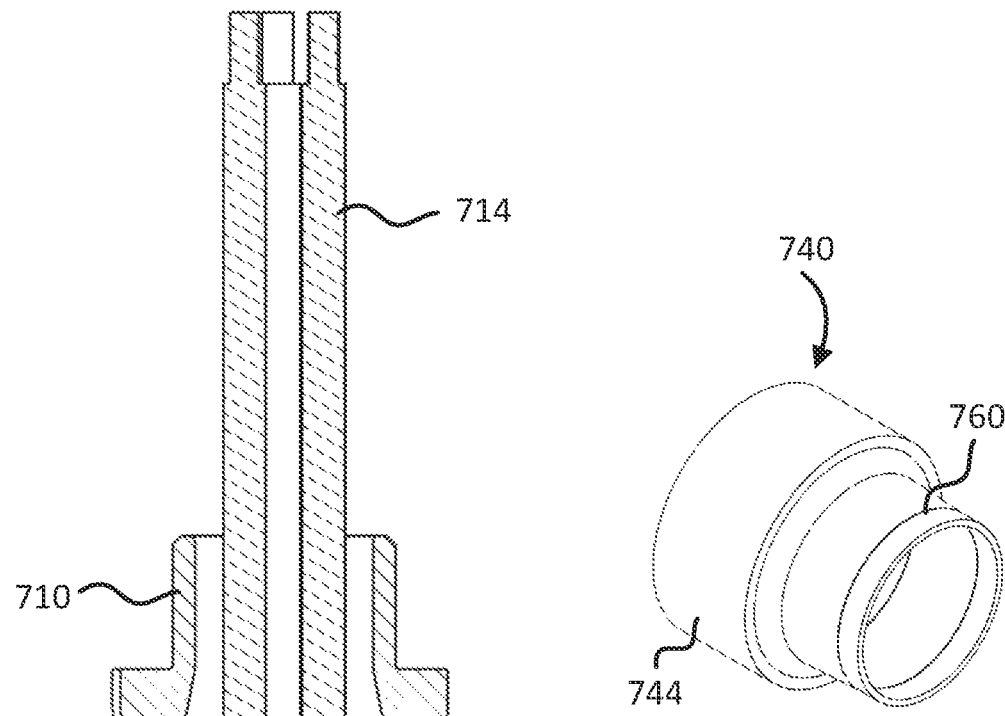
FIG. 12C is an isometric view of a seal of the cable gland shown in FIG. 12A.
Figure 12B:
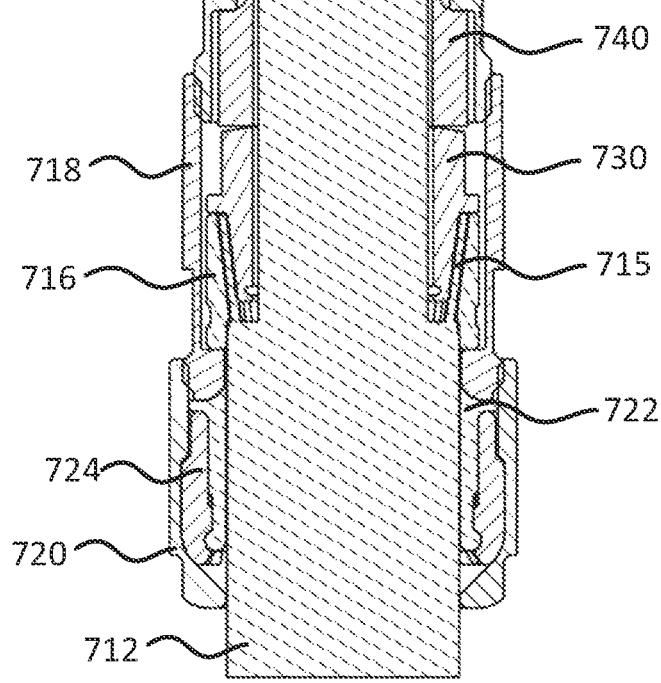
FIG. 12B is a side sectional view of the cable gland shown in FIG. 12A.

FIG. 12B shows a side sectional view of the cable gland 700. The cable gland 700 includes a seal 740 according to the present disclosure and a spigot 730 engaging against the seal 740. As shown in FIG. 12C, the seal 740 includes a compression portion 744 and a tube 760 formed together a single piece of elastic material, such as silicone. As shown in FIG. 12B, a backnut seal 722 and a backnut clamp 724 may be provided between the middlenut 718 and the backnut 720. The cable 712 may have sheathing 715 (e.g., cable armor or braid). An armor clamp 716 provides an anchor for the sheathing 715. In this exemplary embodiment, the seal 740 is a single adaptive seal, i.e., for engaging around a single cable or conductor.

The cable 712 extends through the cable gland 700 from the backnut 720 to the entry 710 (or vice versa). In the exemplary embodiment, the seal 740 may be manufactured with the tube 760 having a distal opening adapted to accommodate a range of cable sizes, or the tube 760 may have a closed distal end which is selectively cut by the installer. The cable 712 is fed through the seal 740. The cable gland 700 is then closed by engaging the entry 710, middlenut 718, and backnut 720.

The middlenut 718 imparts a compressive force onto the adaptive seal 740 via the armor clamp 716 and spigot 730. The cable 712 can then be energized right away. The adaptive seal 740 need not be compressed any more than is necessary to prevent the tube 760 from inverting upon itself, e.g., during a test or in the case of an explosion in an enclosure to which the cable gland 700 is mounted. In some embodiments, the cable gland 700 includes a plurality of markers on the outside (e.g., on the outside of the entry 710) indicating how far to tighten the cable gland 700 to achieve the necessary compression for various cable sizes.

Figure 13A:
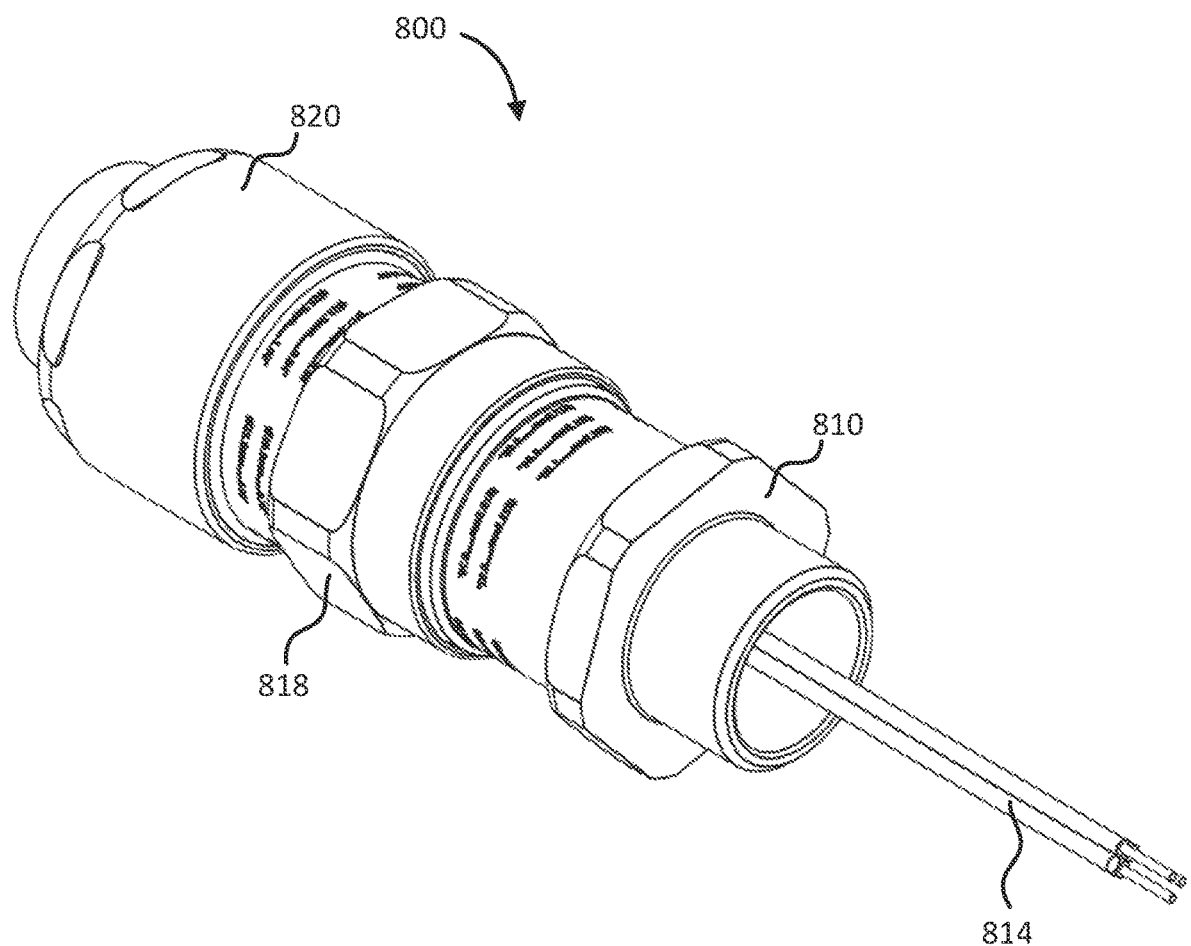
FIG. 13A is an isometric view of a cable gland according to an exemplary embodiment of the present disclosure.

FIG. 13A is isometric view of a cable gland 800 according to an exemplary embodiment of the present disclosure. As one skilled in the art will understand, the cable gland 800 may be suitable for sheathed cables, though it is not limited thereto. The cable gland 800 includes an entry 810, a middlenut 818, and a backnut 820. The cable gland 800 is shown with a cable 812 having a plurality of conductors 814.

Figures 13B, 13C:
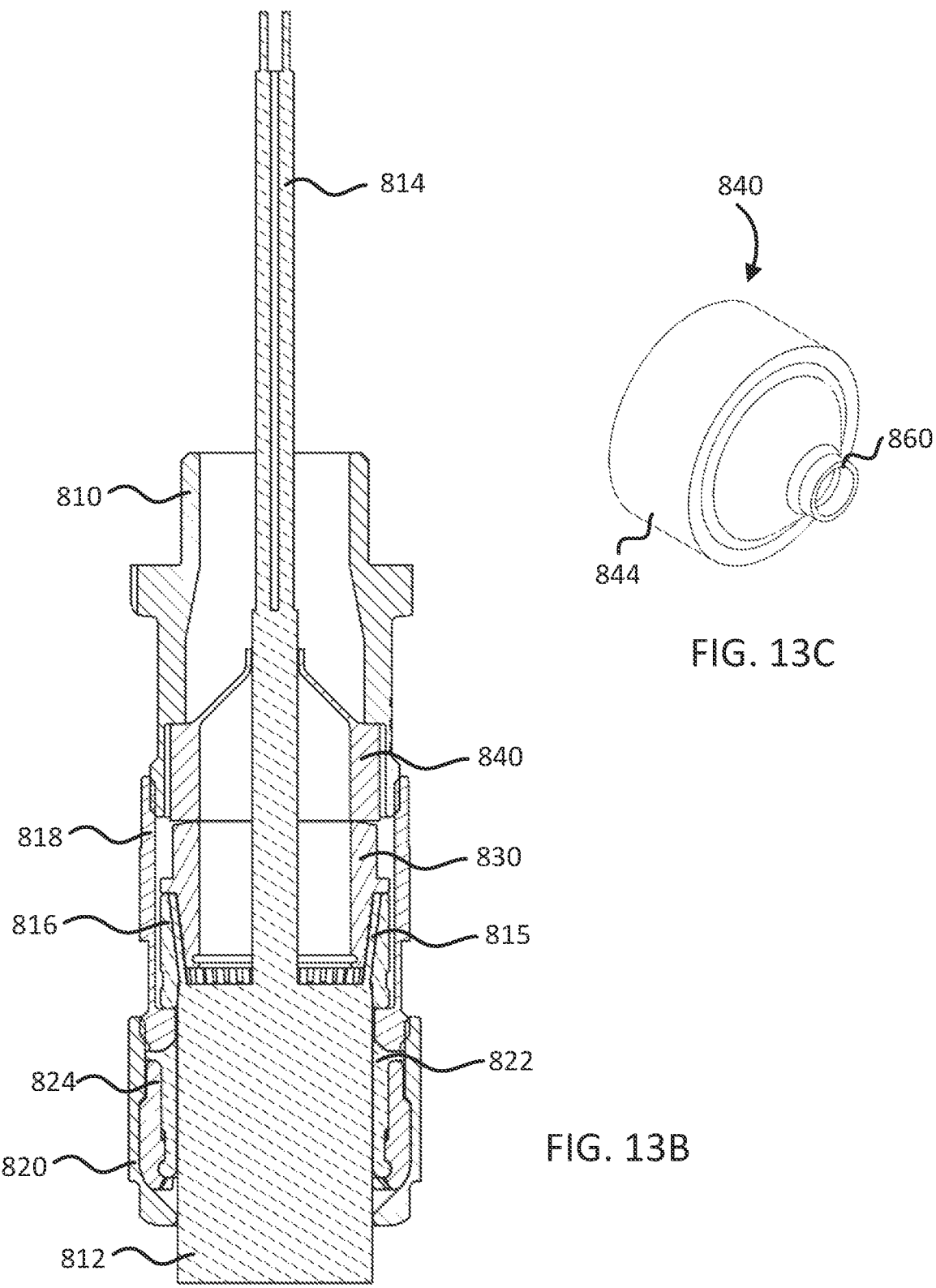
FIG. 13B is a side sectional view of the cable gland shown in FIG. 13A.
FIG. 13C is an isometric view of a seal of the cable gland shown in FIG. 13A.

FIG. 13B shows a side sectional view of the cable gland 800. The cable gland 800 includes a seal 840 according to the present disclosure and a spigot 830 engaging against the seal 840. As shown in FIG. 13C, the seal 840 includes a compression portion 844 and a tube 860 formed together a single piece of elastic material, such as silicone. As shown in FIG. 13B, a backnut seal 822 and a backnut clamp 824 may be provided between the middlenut 818 and the backnut 820. The cable 812 may have sheathing 815 (e.g., cable armor or braid). An armor clamp 816 provides an anchor for the sheathing 815. In this exemplary embodiment, the seal 840 is a single adaptive seal, i.e., for engaging around a single cable or conductor.

The cable 812 extends through the cable gland 800 from the backnut 820 to the entry 810. As in the previous embodiment, the seal 840 may be manufactured with the tube 860 having a distal opening adapted to accommodate a range of cable sizes, or the tube 860 may have a closed distal end which is selectively cut by the installer. The cable 812 is fed through the seal 840. The cable gland 800 is then closed by engaging the entry 810, middlenut 818, and backnut 820.

The middlenut 818 imparts a compressive force onto the adaptive seal 840 via the armor clamp 816 and spigot 830. The cable 812 can then be energized right away. As with the previous embodiment, the adaptive seal 840 need not be compressed any more than necessary to prevent the tube 860 from inverting upon itself. Further, markers may be provided on the outside of the cable gland 800 to indicate how far to tighten the cable gland 800.

Figure 14A:
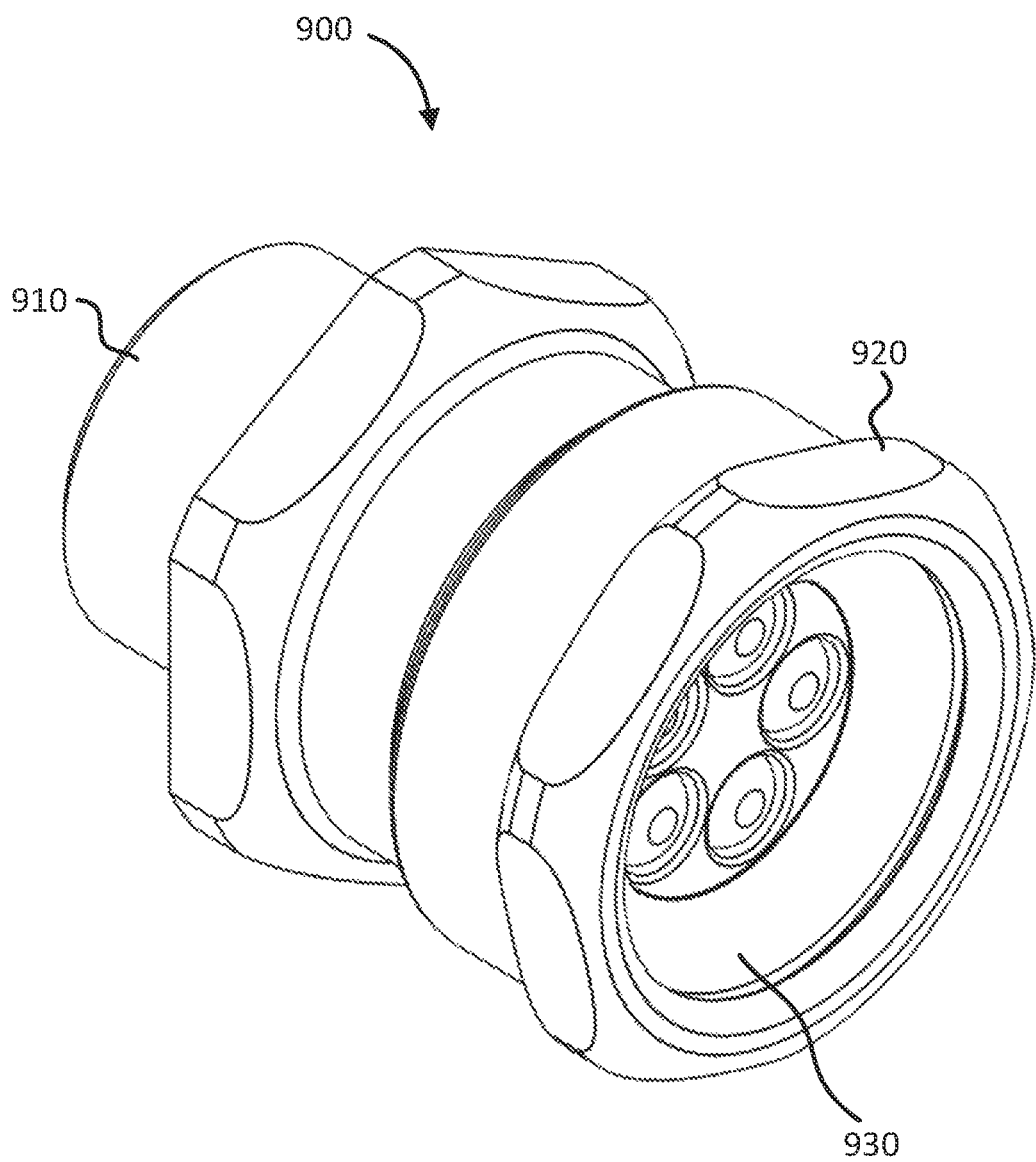
FIG. 14A is an isometric view of a cable gland according to an exemplary embodiment of the present disclosure.

FIG. 14A is an isometric view of a cable gland 900 according to another exemplary embodiment of the present disclosure. The cable gland 900 includes an entry 910 and a backnut 920. The backnut 920 is threadably connected to the entry 910. An adaptive seal 940 according to an exemplary embodiment of the present disclosure is removably positioned within the entry 910. The cable gland 900 may further include a spigot 930.

Figure 14B:
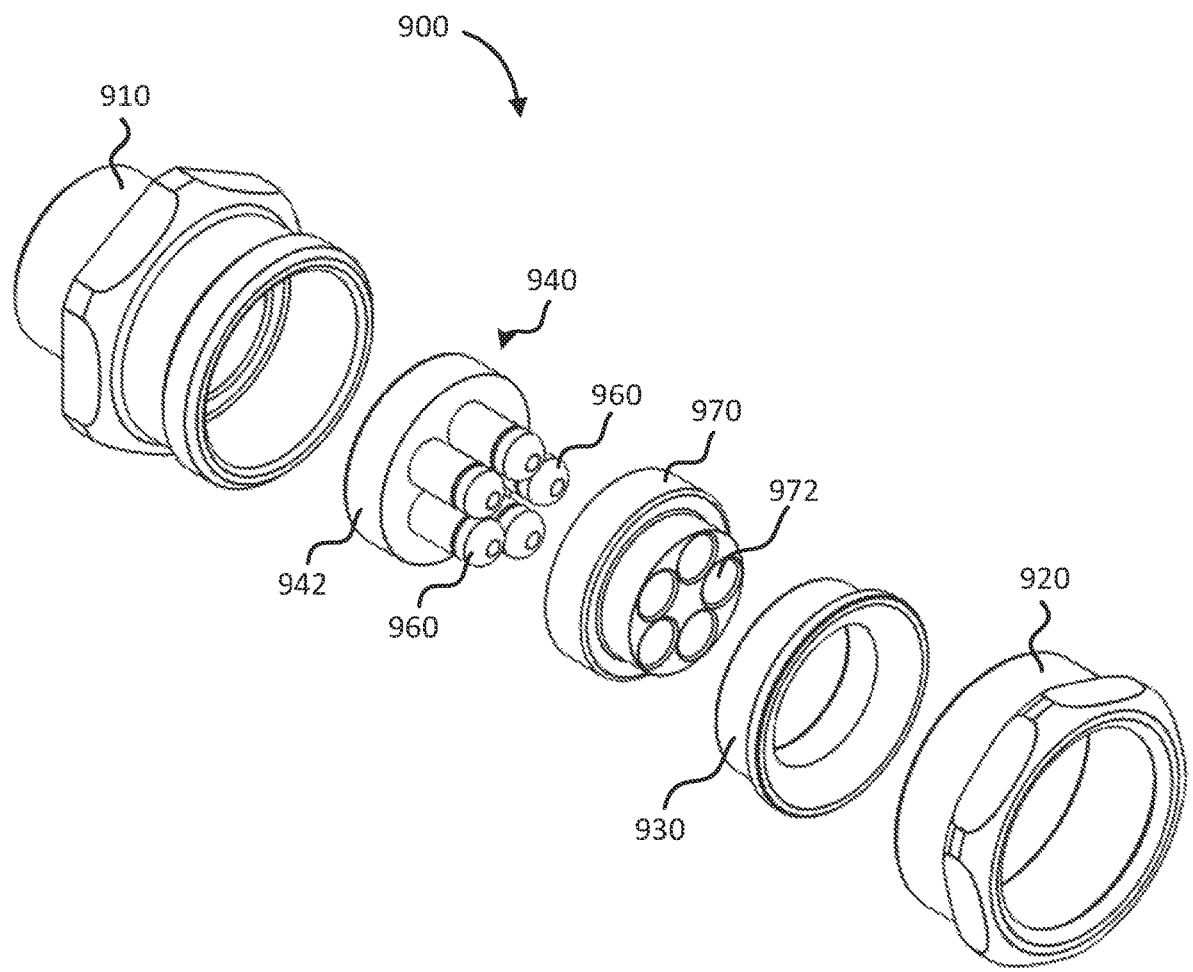
FIG. 14B is an exploded view of the cable gland shown in FIG. 14A.
Figure 14C:
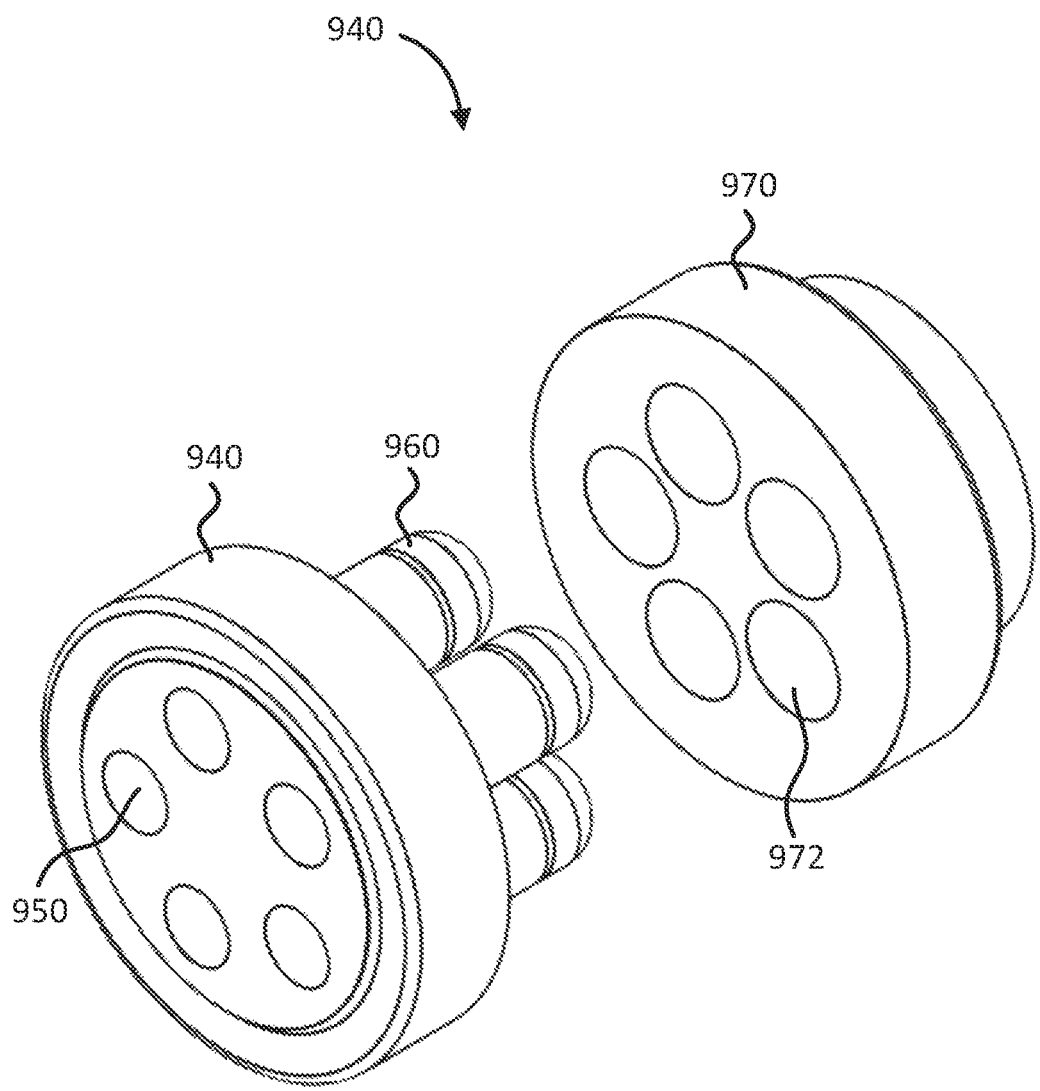
FIG. 14C is an exploded view of a seal of the cable gland shown in FIG. 14A.

FIGS. 14B and 14C are exploded views of the cable gland 900 and the seal 940, respectively. The seal 940 includes a body 942 with a plurality of apertures 950. The seal 940 further includes a plurality of tubes 960. The body 942 and tubes 960 are integrally formed a single piece made from an elastic material, such as silicone. Each aperture 950 has a corresponding tube 960. In the exemplary embodiment, the seal 940 engages with an optional retainer 970 to provide additional structural support to the tubes 960. The retainer 970 includes a plurality of apertures 972 (holes) which receive the tubes 960. The body 942 and retainer 970 together cooperate to form a compression portion. Rotation of the backnut 920 engages the spigot 930 against the retainer 970 to retain the seal 940 within the entry 910 and/or cable gland 100 by compression.

As with previous discussed embodiments, the tubes 960 may be selectively cut or punctured to receive conductors of various sizes. In some applications, a tube 960 may be cut completely off at its base to accommodate a large conductor. In this application, the corresponding aperture 972 of the retainer 970 may form the seal with the conductor.

While the seals according to the present disclosure are generally shown and described as being within an entry of a cable gland and/or between the entry and a middlenut or backnut, these arrangements are only exemplary. Seals according to the present disclosure may be positioned elsewhere within a cable gland, may be used in different types of cable glands or fittings, or alternatively may be housed within an adapter housing that connects (e.g., threadably) to an end of a cable gland or fitting. Such an adapter housing may be used with any of the embodiments described herein. For example, if a first seal is used in a cable gland which is later determined to be the incorrect type of seal, or is otherwise inadequate, damaged, or improperly installed, an adapter housing with a second seal may be added rather than replacing the entire cable gland. This may arise, for example, if an installer inadvertently uses a single adaptive seal when a multiple adaptive seal was necessary (e.g., where a cable is not "effectively filled").

The present disclosure also provides a method of sealing a cable gland using the adaptive seals disclosed herein which overcomes the drawbacks in the prior art. A method of sealing a cable gland includes steps of providing an adaptive seal including a body. The body may include a compression portion defining a distal surface and an insertion portion defining a proximal surface, a plurality of insertion apertures in the proximal surface, a plurality of tubes extending from the distal surface, each having a closed end, and a plurality of channels, each defined between one of the insertion apertures of the body and one of the closed ends of a respective one of the tubes. The method further includes steps of selectively opening at least one of the tubes, inserting a conductor through one of the insertion apertures, through the body, and out the opened end of the tube. The method may further include opening two or more, or all, of the tubes. The method further includes positioning the seal in a cable gland and closing the cable gland. In some embodiments, a spigot of the cable gland applies pressure to the compression portion and retains the seal in the cable gland.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An adaptive seal for a cable gland, comprising:
   a body having a proximal surface and a distal surface;
   an insertion aperture in the proximal surface of the body;
   a tube formed integrally with and extending from the distal surface of the body, the tube having a distal end, wherein the tube at least partially tapers in diameter from the distal surface of the body to the distal end, and wherein the distal end of the tube is closed and adapted to be opened by cutting off the distal end; and
   a channel defined between the insertion aperture of the body and the distal end of the tube, the channel having an inner diameter with a proximal inner diameter at the insertion aperture and the distal surface of the body, and a distal inner diameter at the distal end of the tube, the proximal inner diameter being greater than the distal inner diameter,
   wherein the inner diameter of the channel at least partially tapers from the distal surface of the body to the distal end of the tube, the tube and the channel configured such that cutting off the distal end at a first distance from the distal surface of the body creates a first opening and cutting off the distal end at a second distance from the distance surface creates a second opening, the second opening having a smaller diameter than the first opening.

2. The adaptive seal of claim 1, further comprising:
   a second insertion aperture in the proximal surface of the body;
   a second tube formed integrally with and extending from the distal surface of the body, the second tube having a second distal end; and
   a second channel defined between the second insertion aperture and the second distal end.

3. The adaptive seal of claim 2, wherein the body includes a compression portion defining the distal surface and an insertion portion defining the proximal surface, the compression portion having an outer diameter greater than an outer diameter of the insertion portion, and the compression portion having a length greater than a length of the insertion portion.

4. The adaptive seal of claim 2, further comprising a retainer including holes adapted to receive each of the tube and the second tube.

5. The adaptive seal of claim 1, wherein the body is cylindrical.

6. The adaptive seal of claim 5, wherein an exterior of the tube is positioned radially inward from a cylindrical exterior surface of the body.

7. The adaptive seal of claim 1, wherein the tube has a proximal portion and a central portion between the proximal portion and the distal end, the tube at least partially tapering in diameter along the proximal portion, and the central portion having a constant diameter.

8. An adaptive seal for a cable gland, comprising:
   a body including a compression portion defining a distal surface and an insertion portion defining a proximal surface, the compression portion having an outer diameter greater than an outer diameter of the insertion portion;
   a plurality of insertion apertures in the proximal surface;
   a plurality of tubes extending from the distal surface, each having a closed end and each at least partially tapering in diameter from the distal end of the body to the closed end; and
   a plurality of channels, each defined between one of the insertion apertures of the body and one of the closed ends of a respective one of the tubes;
   wherein the body and the plurality of tubes are integrally formed as a single piece of elastic material, wherein the plurality of channels at least partially taper in inner diameter from the distal surface of the body to the distal end, the tubes and the channels configured such that cutting off the distal end at a first distance from the distal surface of the body creates a first opening and cutting off the distal end at a second distance from the distance surface creates a second opening, the second opening having a smaller diameter than the first opening.

9. The adaptive seal of claim 8, wherein each of the closed ends are adapted to be opened by puncturing the respective closed end.

10. The adaptive seal of claim 8, wherein the body is cylindrical.

11. The adaptive seal of claim 8, wherein the compression portion has a length greater than a length of the insertion portion.

12. A cable gland, comprising:
an entry component;
a backnut threadably engaged to the entry component; and
a seal at least partially within the entry component, the seal including a body having a proximal surface and a distal surface, an insertion aperture in the proximal surface of the body, a tube extending from the distal surface of the body and having a closed end, and a channel defined between the insertion aperture of the body and the closed end of the tube,
wherein the tube and the channel at least partially taper in diameter from the distal surface of the body to the distal end, the tube and the channel configured such that cutting off the distal end at a first distance from the distal surface of the body creates a first opening and cutting off the distal end at a second distance from the distance surface creates a second opening, the second opening having a smaller diameter than the first opening.

13. The cable gland of claim 12, wherein the channel has a proximal inner diameter at the insertion aperture and the distal surface and a distal inner diameter at the closed end, the proximal inner diameter being greater than the distal inner diameter.

14. The cable gland of claim 12, wherein the body of the seal includes a compression portion defining the distal surface and an insertion portion defining the proximal surface, wherein the compression portion is selectively compressed between the entry component and the backnut, the compression portion having an outer diameter greater than an outer diameter of the insertion portion.

15. The cable gland of claim 12, wherein the seal includes a plurality of the insertion apertures and a plurality of the tubes.

16. The cable gland of claim 15, wherein the body and the plurality of tubes are integrally formed a single piece of elastic material.

17. The cable gland of claim 12, wherein the closed end is adapted to be opened by puncturing the closed end.

18. The cable gland of claim 17, wherein, after the closed end is opened, the cable gland is adapted to receive a cable through the backnut, wherein a conductor of the cable extends into the insertion aperture, through the channel, and through the tube.

19. The cable gland of claim 12, further comprising a spigot and a middlenut.

20. The cable gland of claim 14, wherein the compression portion has a length greater than a length of the insertion portion.

* * * * *